US012350215B2

(12) United States Patent
Oetomo et al.

(10) Patent No.: US 12,350,215 B2
(45) Date of Patent: Jul. 8, 2025

(54) ELECTROMECHANICAL ROBOTIC MANIPULANDUM DEVICE

(71) Applicant: THE UNIVERSITY OF MELBOURNE, Melbourne (AU)

(72) Inventors: Denny Oetomo, Melbourne (AU); Ying Tan, Melbourne (AU); Justin Fong, Melbourne (AU); Vincent Crocher, Melbourne (AU)

(73) Assignee: The University of Melbourne, Melbourne (AU)

( * ) Notice: Subject to any disclaimer, the term of this patent is extended or adjusted under 35 U.S.C. 154(b) by 1203 days.

(21) Appl. No.: 16/614,161

(22) PCT Filed: May 25, 2018

(86) PCT No.: PCT/AU2018/050515
§ 371 (c)(1),
(2) Date: Nov. 15, 2019

(87) PCT Pub. No.: WO2018/213896
PCT Pub. Date: Nov. 29, 2018

(65) Prior Publication Data

US 2021/0402247 A1 Dec. 30, 2021

(30) Foreign Application Priority Data

May 26, 2017 (AU) ................................ 2017902010
Oct. 18, 2017 (AU) ................................ 2017904216

(51) Int. Cl.
*A61H 1/00* (2006.01)
*A61H 1/02* (2006.01)
(Continued)

(52) U.S. Cl.
CPC ............. *A61H 1/02* (2013.01); *A61H 1/0274* (2013.01); *A63B 21/00178* (2013.01);
(Continued)

(58) Field of Classification Search
CPC .................................................... A61H 1/0274
See application file for complete search history.

(56) References Cited

U.S. PATENT DOCUMENTS 5,466,213 A * 11/1995 Hogan ..................... A61H 1/02
482/901
9,314,934 B2 * 4/2016 Whitney ............... B25J 19/002
(Continued)

FOREIGN PATENT DOCUMENTS

JP H08-257960 A 10/1996
WO WO 2005/074371 A2 8/2005
(Continued)

OTHER PUBLICATIONS

European Search Report dated Feb. 22, 2021, corresponding to European Patent Application No. 18806484.4.
(Continued)

*Primary Examiner* — Latoya M Louis
(74) *Attorney, Agent, or Firm* — Knobbe Martens Olson & Bear LLP

(57) ABSTRACT

An electromechanical manipulandum device can include: a drive system having a plurality of electrical motors; an arm driveable by the drive system and having three degrees-of-freedom of motion; a capstan transmission for transmitting actuating force from the drive system to the arm; an end-effector coupled to the arm, the end-effector configured to engage a user and having at least three degrees-of-freedom of rotational motion; and a control system for controlling the drive system such as to provide a force to the end-effector in a selected direction.

19 Claims, 21 Drawing Sheets

(51) Int. Cl.
*A63B 21/00* (2006.01)
*A63B 21/005* (2006.01)
*A63B 69/00* (2006.01)

(52) U.S. Cl.
CPC ...... *A63B 21/0058* (2013.01); *A63B 69/0057* (2013.01); *A61H 2201/1261* (2013.01); *A63B 2220/16* (2013.01)

(56) References Cited

U.S. PATENT DOCUMENTS

| | | | | |
|---|---|---|---|---|
| 2008/0009771 A1* | 1/2008 | Perry | A61H 1/0281 600/587 |
| 2012/0179075 A1 | 7/2012 | Perry et al. | |
| 2017/0209327 A1* | 7/2017 | Hou | A63B 23/03525 |

FOREIGN PATENT DOCUMENTS

| | | |
|---|---|---|
| WO | WO 2006/047753 A2 | 5/2006 |
| WO | WO 2010/059066 A1 | 5/2010 |
| WO | WO 2016/008109 A1 | 1/2016 |

OTHER PUBLICATIONS

International Search Report mailed Aug. 23, 2018 in International Application No. PCT/AU2018/050515, filed May 25, 2018, in 5 pages.
Written Opinion mailed Aug. 23, 2018 in International Application No. PCT/AU2018/050515, filed May 25, 2018, in 7 pages.
International Preliminary Report on Patentability mailed Aug. 13, 2019 in International Application No. PCT/AU2018/050515, filed May 25, 2018, in 6 pages.
Anderson et al., "Allied health professionals and work-related musculoskeletal disorders: A systematic review," *Safety and Health at Work*, 7(4):259-267, 2016.
Balasubramanian et al., "A robust and sensitive metric for quantifying movement smoothness," *IEEE Transactions on Biomedical Engineering*, 59(8):2126-2136, 2012.
Basteris et al., "Training modalities in robot-mediated upper limb rehabilitation in stroke: a framework for classification based on a systematic review," *Journal of Neuroengineering and Rehabilitation*, 11(1):111, 2014.
Brokaw et al., "Using the Kinect to limit abnormal kinematics and compensation strategies during therapy with end effector robots," *2013 IEEE International Conference on Rehabilitation Robotics* (*ICORR*), pp. 1-6, IEEE, Jun. 2013.
Burgar et al., "Development of robots for rehabilitation therapy: the Palo Alto VA/Stanford experience," *Journal of Rehabilitation Research and Development*, 37(6):663-674, 2000.
Cirstea et al., "Compensatory strategies for reaching in stroke," *Brain*, 123(6):940-953, 2000.
Dombre et al., *Robot manipulators: modeling, performance analysis and control*, John Wiley & Sons, 2013.
Fong et al., "An investigation into the reliability of upper-limb robotic exoskeleton measurements for clinical evaluation in neurorehabilitation," *Procs 7th Intl IEEE EMBS Neural Engineering Conference*, Apr. 2015.
Fong et al., "Effects of robotic exoskeleton dynamics on joint recruitment in a neurorehabilitation context," *2015 JEEE Intl Conf Rehabilitation Robotics* (*ICORR*), pp. 834-839, IEEE, 2015.
Fong et al., "EMU: a transparent 3D robotic manipulandum for upper-limb rehabilitation," *2017 International Conference on Rehabilitation Robotics* (*ICORR*), pp. 771-776, IEEE, 2017.
Garrec et al., "ABLE, an innovative transparent exoskeleton for the upper-limb," *The IEEE/RSJ International Conference of Intelligent Robots and Systems*, pp. 1483-1488, Sep. 2008.
Gordon et al.. "Anthropometric survey of US Army personnel: Summary statistics, Interim report for 1988," Technical report, DTIC document, 1989.
Hogan et al., "Impedance control: An approach to manipulation," *Procs. American Control Conference*, pp. 304-313, 1984.
Hogan et al., "MIT-MANUS: a workstation for manual therapy and training," *Proceedings of the IEEE International Workshop on Robot and Human Communication*, pp. 161-165, 1192.
Huang et al., "Robotic neurorehabilitation: a computational motor learning perspective," *Journal of Neuroengineering and Rehabilitation*, 6(1):5, 2009.
Hubbard et al., "Task-specific training: evidence for and translation to clinical practice," *Occupational Therapy International*, 16(3-4):175-189, 2009.
Jarrassé et al., "A methodology to quantify alterations in human upper limb movement during co-manipulation with an exoskeleton," 18(4):389-397, 2010.
Jarrassé et al., "Connecting a human limb to an exoskeleton," *IEEE Transactions on Robotics*, 28(3):697-709, 2012.
Johnson et al., "Development of ADLER: the activities of daily living exercise robot," *The First IEEE/RAS-EMBS International Conference on Biomedical Robotics and Biomechatronics, 2006* (*BioRob 2006*), pp. 881-886, IEEE, 2006.
Khatib, "A unified approach for motion and force control of robot manipulators: The operational space formulation," *IEEE Joumal on Robotics and Automation*, 3(1):43-53, 1987.
Kim et al., "Redundancy resolution of a human arm for controlling a seven dof wearable robotic system," *2011 Annual International Conference of the IEEE Engineering in Medicine and Biology Society, EMBC*, pp. 3471-3474, IEEE, 2011.
Levin, "Interjoint coordination during pointing movements is disrupted in spatic hemiparesis," *Brain*, 119(1):281-293, 1996.
Maciejasz et al., "A survey on robotic devices for upper limb rehabilitation," *Journal of neuroengineering and rehabilitation*, 11(1):3, 2014.
Marchal-Crespo et al., "Review of control strategies for robotic movement training after neurologic injury," *Journal of Neuroengineering and Rehabilitation*, 6(1):20, 2009.
Nef et al., "Armin: a robot for patient-cooperative arm therapy," *Medical & biological engineering & computing*, 45(9):887-900, 2007.
Nef et al., "ARMin-robot for rehabilitation of the upper extremities," *Proceedings 2006 IEEE International Conference on Robotics and Automation* (*ICRA 2006*), pp. 3152-3157, IEEE, 2006.
Nordin et al., "Assessment of movement quality in robot-assisted upper limb rehabilitation after stroke: a review," *Journal of Neuroengineering and Rehabilitation*, 11(1):137, 2014.
Pehlivan et al., "Minimal assist-as-needed controller for upper limb robotic rehabilitation," *IEEE Transactions on Robotics*, 32(1):113-124, 2016.
Shirzad et al., "Evaluating the user experience of exercising reaching motions with a robot that predicts desired movement difficulty," *Journal of Motor Behavior*, pp. 31-46, 2015.
Van Der Linde et al., "The hapticmaster, a new high-performance haptic interface," *Proc. Eurohaptics*, pp. 1-5, 2002.
Weightman, et al., "What should we consider when designing rehabilitation robots for the upper limb of the neurologically impaired?" *Procs Australasian Conf Robotics and Automation*, pp. 1-10, 2014.
Wu et al., "IBS recommendation on definitions of joint coordinate systems of various joints for the reporting of human joint motion part ii: Shoulder, elbow, wrist and hand," *Journal of Biomechanics*, 38(5):981-992, 2005.
Zhou et al., "Learning control in robot-assisted rehabilitation of motor skills—a review," *Journal of Control and Decision*, 3(1):19-43, 2016.
Office Action dated Jun. 17, 2022 in Chinese Application No. ZL201880034785.0, 41 pages.

* cited by examiner

ELECTROMECHANICAL ROBOTIC MANIPULANDUM DEVICE

CROSS REFERENCE TO RELATED APPLICATIONS

The present application is a U.S. national phase application under 35 U.S.C. § 371 of International Application No. PCT/AU2018/050515, filed on May 25, 2018 and published as WO 2018/213896 A1 on Nov. 29, 2018, which claims priority to AU application Nos. 2017902010 and 2017904216, filed on May 26, 2017, and Oct. 18, 2017, respectively. The content of each of these applications is incorporated herein by reference in its entirety.

FIELD OF THE INVENTION

The invention relates to an electromechanical robotic manipulandum device, of particular but by no means exclusive application as an electromechanical robotic manipulandum device for rehabilitation, such as for upper-limb rehabilitation.

BACKGROUND OF THE INVENTION

Motor recovery from neurological injuries is driven by intensive therapy involving repetitions of goal-orientated movements. A number of robotic devices designed for use in the rehabilitation of the upper extremity for neurologically impaired patients have been developed over the past 20 years [1]. Such devices mechanically interact with the patient whilst the patient attempts to perform motor actions, either assisting or challenging the patient in a structured way, aimed at accelerating and furthering the patient's recovery. The specific purpose and mode of interaction with the human user dictate a set of design criteria for an ideal upper limb rehabilitation robot, such as are reviewed in [2]. Principal among the desired combination of characteristics are the transparency of the device (which allows forces exerted by the user to affect the motion of the robot), ease of setup for each patient, large workspace and sufficient static load. The trade-off between transparency and the static load capability is also influenced by the inertial bandwidth of the mechanism. However, it has been recognized that the required motions in rehabilitation exercises are of low to medium velocity, thus allowing the trade-off to be made in an otherwise highly stringent (and expensive) set of design requirements.

Existing physically assistive devices are conventionally classified into two types: robotic manipulanda and exoskeletons. Manipulanda interact with the user at only a single point (usually by a handle or a support piece strapped to the wrist or the forearm); they include devices such as the MIT Manus [3] and the MIME [4]. Exoskeletons have kinematics designed to conform to that of the skeletal system of the limb, and thus should include a matching degree of freedom for each modelled physiological degree of freedom. Examples of exoskeletons include the ARMin [5], the ArmeoPower (Hocoma, Switzerland) and the ABLE platform [6].

However, existing manipulanda do not fully regulate the posture of the patient's arm, which may lead to situations where for pathological synergies [7] are not accounted for in the patient's movements. Furthermore, the majority of existing manipulanda do not allow non-planar movements during exercises—movements that occur often in activities of daily living.

Exoskeleton devices have been utilised to produce 3D (spatial) arm motion in rehabilitation. However, this comes at a cost to other aspects of the device. Existing exoskeleton also have difficulty in providing a good match between the kinematics of the robot and the human users. When the axes of movement of the device do not perfectly align with that of the user, a mechanical constraint is created that hampers movement. Furthermore, owing to patient variation in arm and body shapes, a more complex set-up is required, as the lengths of the exoskeleton's robotic links must be adjusted for each patient. Furthermore, owing to the serial kinematics of the exoskeleton, required to conform to the limb, mechanical inertia introduced by the drive motors and various rigid linkages are commonly distributed along the serial arm, reducing the robot's dynamic transparency (which allows forces exerted by the user to affect the motion of the robot). This is further magnified by the need for a sizeable joint torque, resulting in significant motor inertia involved in the moving parts of the robot. This is typically addressed by introducing a high gear ratio to the motor, but this compromises the backdriveability of the device. Finally, exoskeletons are often of relatively high cost owing to their relatively complicated configuration.

In addition, in rehabilitation from neurological injuries, gravity compensation or deweighting of the (upper) limb is often desired, as such deweighting allows movement when the patient has limited muscle activity. That is, the forces produced by these muscles are not enough to overcome the effects of gravity before producing an acceleration of the limb. With existing upper limb robotic devices, methods of providing deweighting are relatively simple. For example, an exoskeleton may can apply a compensatory torque joint-by-joint and two dimensional manipulanda provide deweighting by nature of their planar design. Providing deweighting with a three dimensional manipulandum is more complex, as there is no direct equivalence between the forces which can be applied to the patient and the required deweighting torques at each joint.

SUMMARY OF THE INVENTION

According to a first broad aspect of the present invention, there is provided an electromechanical manipulandum device, comprising:

- a drive system comprising a plurality of electrical motors;
- an arm driveable by the drive system and having three degrees-of-freedom of motion;
- a capstan transmission for transmitting actuating force from the drive system to the arm;
- an end-effector coupled to the arm, the end-effector configured to engage a user and having at least three degrees-of-freedom of rotational motion; and
- a control system for controlling the drive system such as to provide a force to the end-effector in a selected direction.

In an embodiment, the capstan transmission comprises at least one bushing rotatably drivable by an electrical motor and a corresponding capstan wheel, wherein the bushing is configured to cause rotation of its corresponding capstan wheel via an associated transmission wire. The, or each, transmission wire may be secured to its associated busing. The, or each, transmission wire may be secured via threading of the transmission wire through a hole of the bushing. The, or each, transmission wire may be secured via a fastening means. There may be a bushing for each degree of freedom of the arm.

In an embodiment, the device further comprises a support for supporting the actuated mechanical system.

In a certain embodiment, the device is configured to engage an upper-limb of the user. The device may be configured for rehabilitation of the upper-limb. In particular embodiments, the device is configured for rehabilitating the user, or to assist exercising or training by the user.

In an embodiment, the device may be controllable by the control system to resist inappropriate or less desirable physical movement by the user, and hence encourage more appropriate or desirable physical movement.

The arm may be a semi-parallel arm. In an embodiment, each degree-of-freedom of the end-effector is unactuated. In another embodiment, at least one degree-of-freedom of the end-effector is actuated.

In an embodiment, the device is controllable by the control system to apply force to the user to assist movement by the user.

In a certain embodiment, the device is controllable by a control system to compensate for a portion of a weight of the device to which the user would otherwise be subjected (hence to provide gravity compensation), and/or for friction within the device.

In another embodiment, the device is configured to track the position and/or orientation of the end-effector and to output one or more signals indicative thereof. The device may comprise one or more sensors arranged to output signals indicative of the orientation of the end-effector.

In one embodiment, the device further comprises a feedback generator for providing feedback indicative of a position and/or orientation of the end-effector.

In an embodiment, the device is configured to engage a limb of the user, and the device further comprise a feedback generator for providing feedback indicative of a position and/or a posture of the limb.

In one embodiment, the device is configured to be used by the user in an interaction with another physical object (such as an item of cutlery or crockery) or a computer input device (such as a touch screen).

According to a second broad aspect of the present invention, there is provided a method of rehabilitating, training or assisting a user, the method comprising:

controlling a device according to the first aspect and coupled to the user, with the control system, to resist inappropriate or less desirable physical movement by the user, to encourage more appropriate or desirable physical movement by the user, or to assist the movement of the user toward a goal of a physical movement of the user.

The method may further comprise coupling a portion of an upper limb of the user to the passive end-effector.

According to a third broad aspect of the present invention, there is provided an exercise method, the method comprising:

- controlling a device according to the first aspect and coupled to the user, with the control system, to resist less desired physical movement by the user, encourage more desired physical movement by the user, or to assist the movement of the user toward a goal of a physical movement of the user.

The method may further comprise coupling a portion of an upper limb of the user to the passive end-effector.

According to a fourth broad aspect of the present invention, there is provided a method of assisting a user to interact with an object, the method comprising:

- controlling a device according to the first aspect and coupled to the user, with the control system, to assist the movement of the user toward a goal of a physical movement of the user.

In an embodiment, the object is an article (such as an item of cutlery or crockery) or a computer input device (such as a touch screen).

According to a fifth broad aspect of the present invention, there is provided a deweighting apparatus for an electromechanical manipulandum device, the deweighting apparatus comprising:

- a controller configured to receive inputs indicative of joint angles of a limb, masses of a forelimb and an upper-limb of the limb, inertia matrices of the forelimb and upper-limb, and lengths of the forelimb and upper-limb;
- wherein the controller is configured to determine forces and moments to be applied by the electromechanical manipulandum device to the limb from the inputs according to:

$$\begin{bmatrix} f_r \\ m_r \end{bmatrix} = J_h^{T\#}(q_h)g_h(q_h),$$

where $q_h$ are the generalized coordinates of the limb, $g_h(q_h)$ is a vector corresponding to torques of limb joints due to gravity, and $J^{T\#}_h(q_h)$ is a generalized inverse transpose of the limb Jacobian given by:

$$J_h^{T\#}(q_h)=(J_h(q_h)M_h(q_h)^{-1}J_h(q_h)^T)^{-1}J_h(q_h)M_h(q_h)^{-1},$$

where $M_h(q_h)$ is an inertia matrix.

In an embodiment, the controller is configured to determine the forces and moments according to:

$$f_r=J_h^{T\#}(q_h)g(q_h).$$

The deweighting apparatus may comprise a processor for receiving spatial orientations of at least three spatial orientation sensors located on the limb and configured to determine therefrom the joint angles of the limb and passing the joint angles to the controller.

In another embodiment, the input indicative of the joint angles comprises spatial orientations of at least three spatial orientation sensors located on the limb, and the controller is configured to determine therefrom the joint angles of the limb.

In an embodiment, the deweighting apparatus comprises the at least three spatial orientation sensors.

According to a sixth broad aspect of the present invention, there is provided a device according to the first broad aspect, further comprising a deweighting apparatus according to the fifth broad aspect.

According to a seventh broad aspect of the present invention, there is provided a mechatronics handle for an electromechanical manipulandum device, the mechatronics handle comprising:

- an end-effector couplable to an arm of the manipulandum device, the end-effector configured having at least three degrees-of-freedom of motion;
- wherein the end-effector comprises a wrist cuff configured to engage a user, the wrist cuff being rotatable about an axis in-line with a subject's forelimb corresponding to prono-supination rotation and corresponding to one of the degrees-of-freedom of motion.

It should be noted that the end-effector may be regarded as constituting the mechatronics handle.

In an embodiment, the wrist cuff comprises an outer shell and an inner shell rotatable within the outer shell.

In another embodiment, the mechatronics handle further comprises a motor for controlling an angular orientation of the wrist cuff.

In a particular embodiment, the wrist cuff comprises an outer shell and an inner shell rotatable within the outer shell, and the motor is controllable to control the angular orientation of the inner shell relative to the outer shell.

The motor may be controllable to cease controlling the angular orientation of the wrist cuff so that the prono-supination joint is left free to rotate.

In some embodiments, two of the other degrees-of-freedom of motion are lockable.

The mechatronics handle may comprise a microcontroller configured to receive orientations of the passive arm and of the mechatronics handle and to generate therefrom control commands to control the angular position of the writs cuff.

According to an eighth broad aspect of the present invention, there is provided an electromechanical manipulandum device, comprising:

- a drive system comprising a plurality of electrical motors;
- an arm driveable by the drive system and having three degrees-of-freedom of motion;
- a capstan transmission for transmitting actuating force from the drive system to the arm;
- an end-effector coupled to the arm, the end-effector configured to engage a user and having at least three degrees-of-freedom of motion and an ability to control the user prono-supination motion; and
- a control system for controlling the drive system such as to provide a force to the end-effector in a selected direction.

In an embodiment, the end-effector comprises a wrist cuff configured to engage a user, the wrist cuff being rotatable about an axis in-line with a subject's forelimb corresponding to prono-supination rotation and corresponding to one of the degrees-of-freedom of motion.

In an embodiment, the wrist cuff comprises an outer shell and an inner shell rotatable within the outer shell.

The device may further comprise a motor for controlling an angular orientation of the wrist cuff. The wrist cuff may comprise an outer shell and an inner shell rotatable within the outer shell, and the motor is controllable to control the angular orientation of the inner shell relative to the outer shell.

The device may further comprise a deweighting apparatus according to the fifth aspect.

It should be noted that any of the various individual features of each of the above aspects of the invention, and any of the various individual features of the embodiments described herein including in the claims, can be combined as suitable and desired.

BRIEF DESCRIPTION OF THE DRAWING

In order that the invention may be more clearly ascertained, embodiments will now be described, by way of example, with reference to the accompanying drawing, in which.

DETAILED DESCRIPTION OF EMBODIMENTS

Figure 1A:
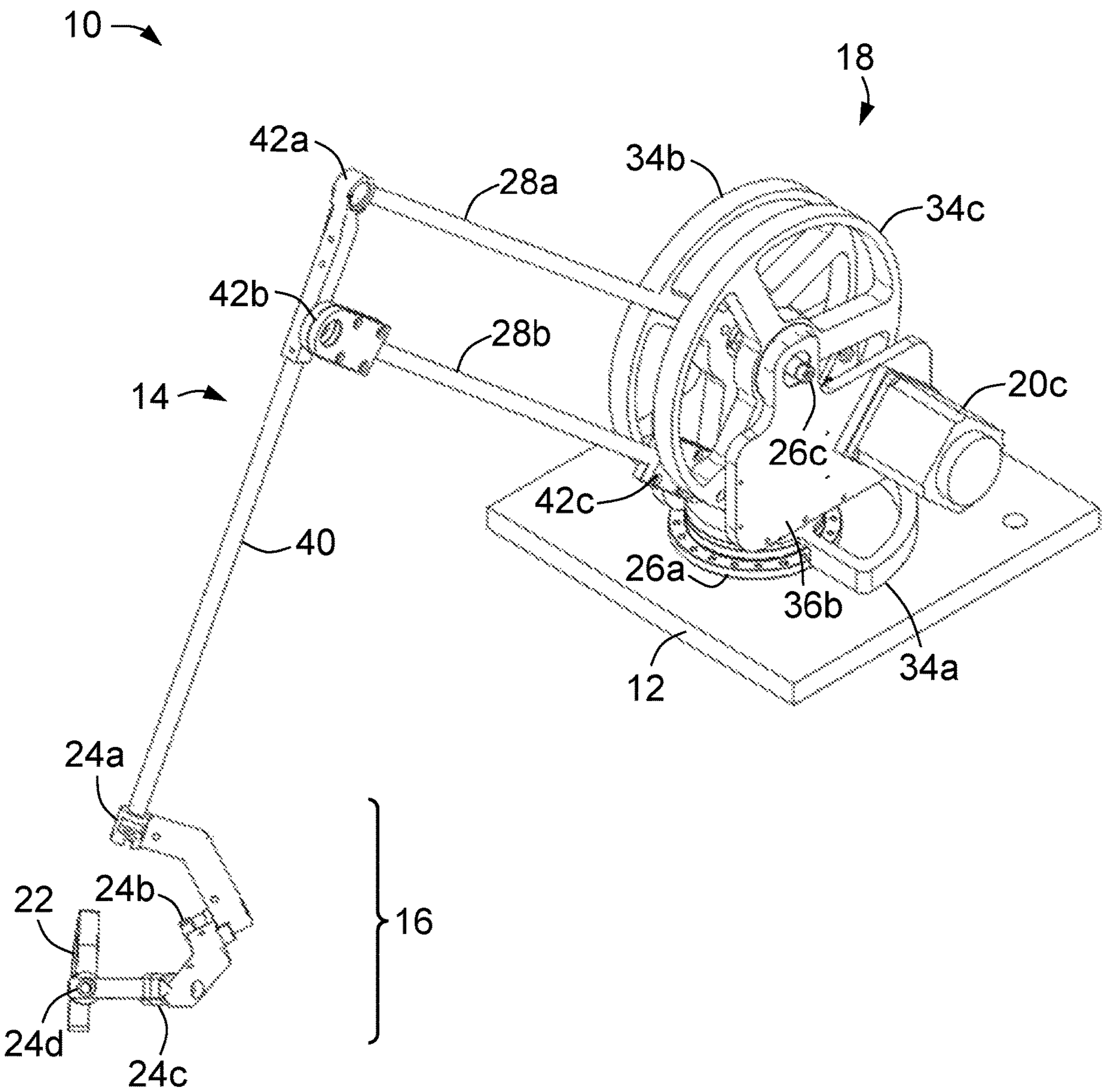
FIGS. 1A and 1B are left perspective and right side views, respectively, of an electromechanical robotic manipulandum device for upper-limb rehabilitation according to an embodiment of the present invention.
Figure 1B:
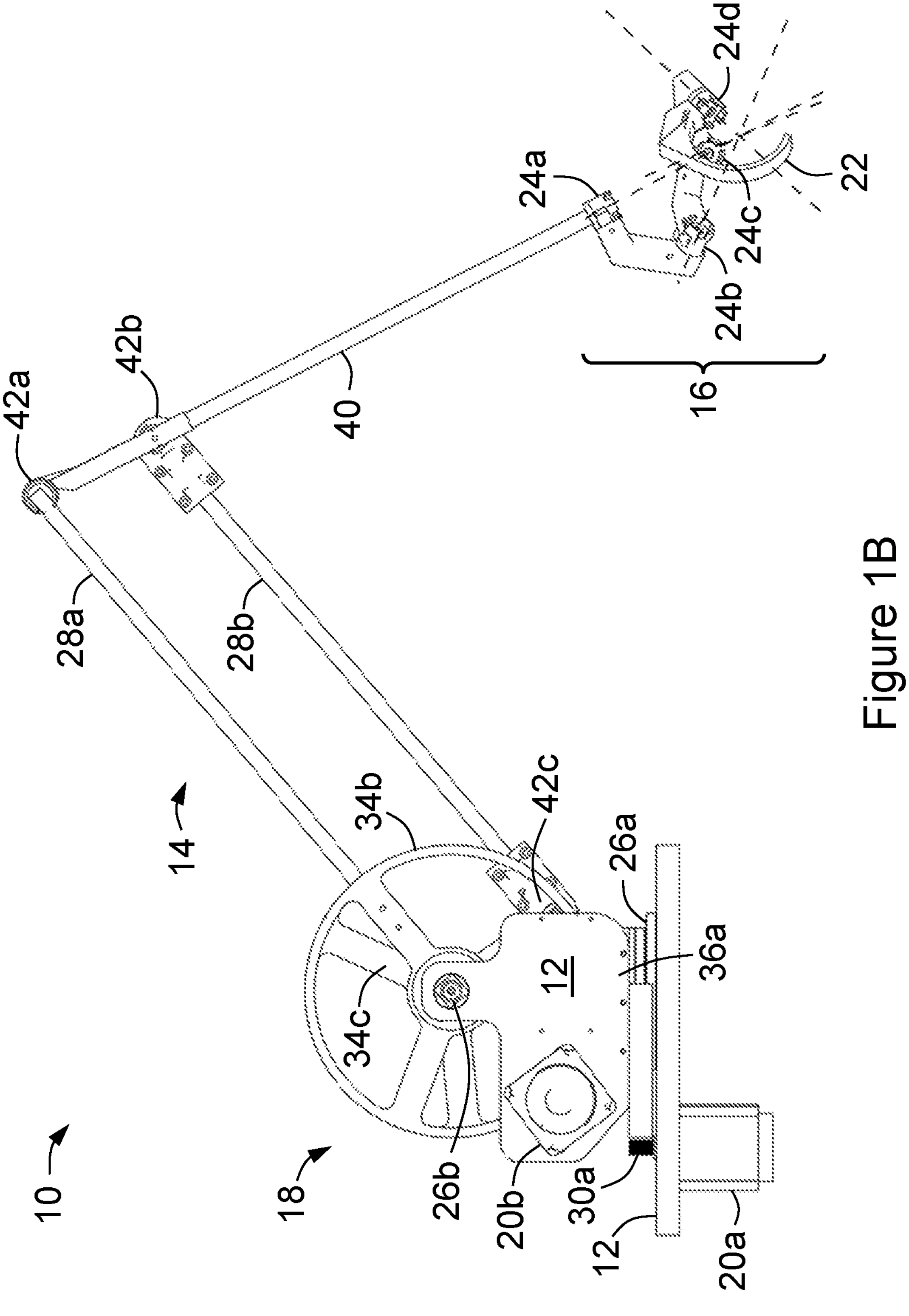
Figure 1C:
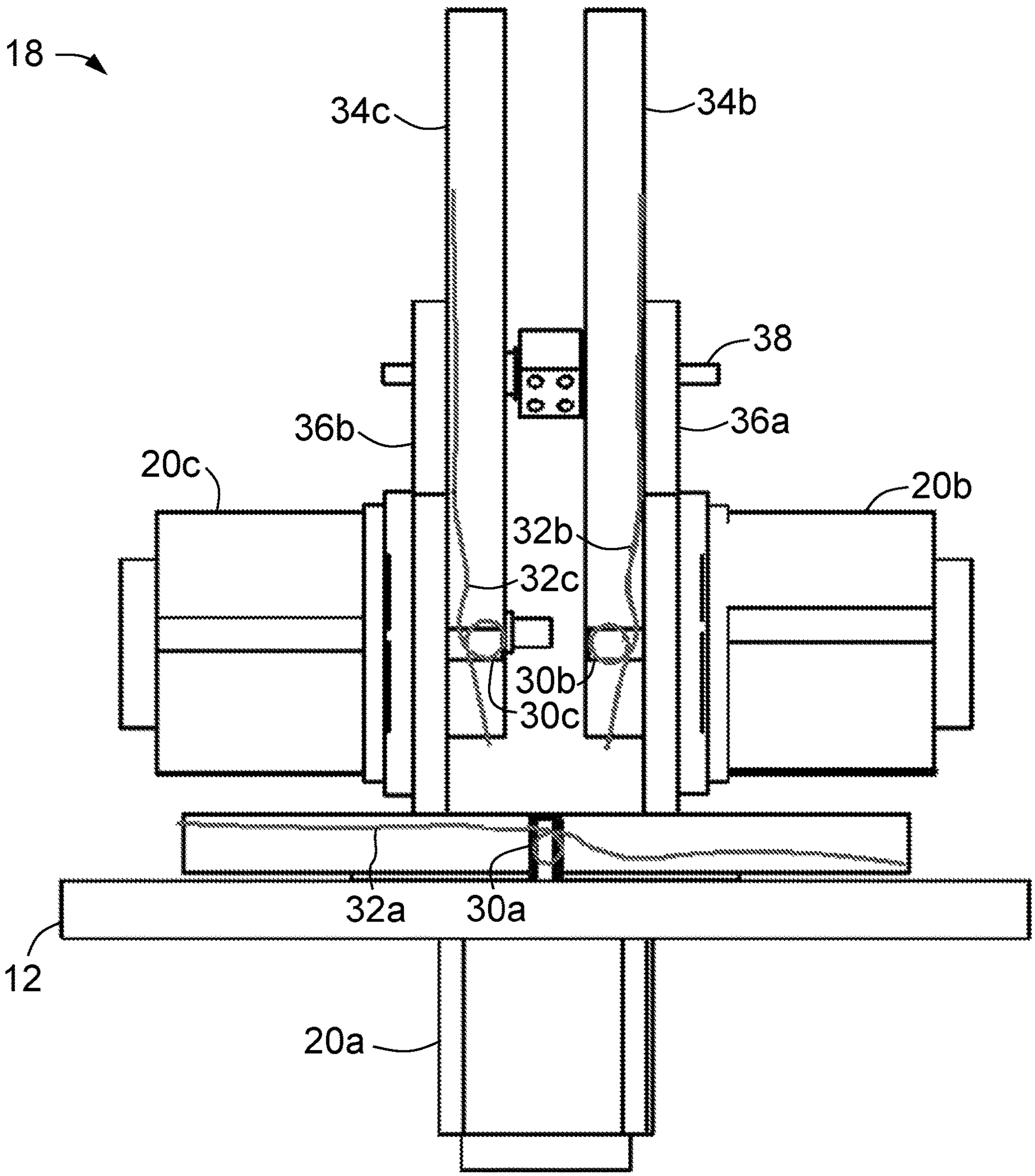
FIG. 1C is a rear view of the actuated mechanical system of the device of FIGS. 1A and 1B.

FIGS. 1A and 1B are left perspective and right-side views, respectively, of an electromechanical robotic manipulandum device 10 for upper-limb rehabilitation according to an embodiment of the invention. FIG. 1C is a rear view of the actuated mechanical system of the device 10.

Device 10 is configured to provide assistance for the rehabilitation of the upper limb (particular of patients with neurological motor impairment, such as resulting from a stroke). While device 10 is a configured for upper-limb rehabilitation, it will be appreciated that alternative embodiments may be configured for other purposes, such as for the rehabilitation of other moveable parts (e.g. lower limbs, forelimbs, hind limbs, neck, back, pelvis) of a human or animal body, for training purposes (e.g. to encourage the correct movement of, for example, an upper limb in sport or the performing arts), or for exercise.

Advantages of device 10 can include one or more of (1) a large workspace in 3D, (2) ease of set-up for each patient, and (3) high transparency. With a user (such as a patient) with some arm motor functionality, this transparency can make a passive method of detection and interaction possible, allowing device 10 to be used as an assessment device and to regulate the safe amount of force applied in the exercises. Device 10 has, for example, a semi-parallel mechanism (described below) and provides high backdrivability.

Referring to FIGS. 1A to 1C, device 10 has a support in the form of a base 12 (though the support could alternatively comprise, for example, a frame), an arm 14 (which is typically a semi-parallel passive arm 14 as shown), and an end-effector. In an embodiment, the end-effector is in the form of spherical wrist unit 16 coupled to passive arm 14. Generally, herein, it should be assumed that reference to wrist unit 16 is synonymous with reference to an end-effector. Device 10 further includes a backdrivable, actuated mechanical system 18 in the form of a drive system comprising three electrical motors 20*a*, 20*b*, 20*c* that confers three degrees-of-freedom of motion (corresponding to axes q1, q2, q3) on arm 14. Base 12 supports actuated mechanical system 18.

Wrist unit 16 comprises a wrist cuff 22 and a series of at least three revolute joints (in this embodiment, four joints 24*a*, 24*b*, 24*c*, 24*d* are provided). Revolute joints 24*a*, 24*b*, 24*c*, 24*d* form a ball-joint mechanism centred at the expected centre of the user's wrist and providing wrist cuff 20 (and hence the user's wrist) with corresponding degrees-of-freedom of motion corresponding to respective axes q4, q5, q6, q7. In an embodiment, wrist unit 16 is not actuated, but its motion is measured (as described below). In another embodiment, one or more of the axes q4, q5, q6, q7 can be actuated. In this embodiment, the actuated axes q4, q5, q6, q7 can be configurable such that, as an option during use, any or all of the actuated axes q4, q5, q6, q7 are not actually actuated (i.e. no actuating force is applied to the axes q4, q5, q6, q7).

Actuated mechanical system 18 is a mechanically transparent (or at least substantially transparent) mechanism designed to operate in a workspace suitable for the movements of, in an embodiment, the hand of at least 0.8 m×0.8 m×1.0 m. The transparency can be achieved with a backdrivable mechanism driven by impedance control.

Actuated mechanical system 18 includes three rotational joints 26*a*, 26*b*, 26*c*, facilitating rotation about axes q1, q2, q3. First joint 26*a* is rotational around a vertical axis q1; the second and third joints 26*b*, 26*c* actuate a parallel mechanism (including beam 28*a*, 28*b*) of arm 14. To achieve the desired transparency, joints 26*a*, 26*b*, 26*c* are actuated using a capstan transmission mechanism (described below). Additionally, joints 26*a*, 26*b*, 26*c* are backdrivable.

The actuated mechanical system 18 comprises electrical (e.g. DC) motors 20*a*, 20*b*, 20*c*, which are typically directly controlled in torque and may be equipped with rotary encoders to measure motor position.

Threaded capstan bushings 30*a*, 30*b*, 30*c* are attached to shafts of motors 20*a*, 20*b*, 20*c*, respectively. The bushings 30*a*, 30*b*, 30*c* are typically threaded to correctly position transmission wires 32*a*, 32*b*, 32*c* (described below) to be wrapped around bushings 30*a*, 30*b*, 30*c* (cf. FIG. 1C), respectively.

First capstan wheel 34*a* (about first axis q1) implements the transmission and applies a reduction ratio. First capstan wheel 34*a* can be constructed as either a complete circle, or an angular subsection of a wheel, according to the maximum extent of its intended rotation. First axis q1 has a vertical axis of rotation, and positions the parallel mechanism 28*a*, 28*b* in an upright plane.

Second capstan wheel 34*b* (about second axis q2) is similar in design to first capstan wheel 34*a*, but actuates upper beam 28*a* of parallel mechanism 28*a*, 28*b*.

Third capstan wheel 34*c* (about third axis q3) is similar in design to first capstan wheel 34*a*, but actuates lower beam 28*b* of parallel mechanism 28*a*, 28*b*.

Transmission wires 32*a*, 32*b*, 32*c* act as a mechanism for transmission between capstan bushings 30*a*, 30*b*, 30*c* and respective capstan wheels 34*a*, 34*b*, 34*c*, and are advantageously of a material of minimal extensibility (such as steel).

The embodiment includes side brackets 36*a*, 36*b* providing a supporting structure that supports a main shaft 38 that in turn supports second and third capstan wheels 34*b*, 34*c* (and hence defines axis q2), and also provides a mounting for second and third motors 20*b*, 20*c* and associated motor electronics (not shown). Side brackets 36*a*, 36*b* are desirably constructed of lightweight materials, such as aluminium, to minimize inertia.

Upper beam 28*a* is the first of the principal components of the parallel mechanism of arm 14, according to this embodiment, and is driven by second capstan wheel 34*b*. Upper beam 28 is constructed of a lightweight but rigid material to minimize weight, such as aluminium tube.

Lower beam 28*b* is the second of the four principal components of the parallel mechanism of arm 14, according to this embodiment, and is driven by third capstan wheel 34*c*. It is also constructed of a lightweight but rigid material to minimize weight, such as aluminium tube.

Distal beam 40 is pivotably coupled to upper and lower beams 28*a*, 28*b*, and—at its distal end—is coupled to wrist unit 16. Distal beam 40 is the third of the four principal components of the parallel mechanism of arm 14, according to this embodiment, and is constructed of lightweight but rigid material to minimize weight, such as aluminium tube.

Passive joints 42*a*, 42*b*, 42*c* are the fourth of the four principal components of the parallel mechanism of arm 14, according to this embodiment; passive joints 42*a*, 42*b* facilitate the pivoting of distal beam 40 relative to upper and lower beams 28a, 28b; passive joint 42c couples lower beam 28b to third capstan wheel 34c, and facilitates the pivoting of lower beam 28b relative to third capstan wheel 34c; passive joints 42a, 42b, 42c, which are generally unmeasured, comprise dual row ball-bearings.

The reduction ratio of each capstan wheel 34a, 34b, 34c is defined by the ratio of its diameter to the diameter of its corresponding capstan bushing 30a, 30b, 30c (in the range of 10:1 to 30:1). Capstan wheels 34a, 34b, 34c are constructed of a suitably rigid material, and are preferably of a lightweight material to limit their inertia (e.g. a hard plastics material such as PVC, or aluminium).

According to an embodiment, wrist unit 16 includes a passive spherical joint attachable to the wrist or forearm of the user. The arrangement of joints 24a, 24b, 24c, 24d allows rotation in any direction, whilst maintaining the position of the centre of the wrist, or equivalent, at approximately the same location. In this embodiment, the wrist or forearm of the user is attached to wrist unit 16 with wrist cuff 22, or alternatively with a splint or other suitable structure, which allows the hand to remain free, allowing the patient to interact directly with objects during rehabilitation exercises, including objects such as physical, everyday objects (e.g. cutlery, cups, pens), or (for purposes of virtual rehabilitation) through physical computer interfaces such as a touch screen, a keyboard or a mouse.

According to another embodiment, one joint 24a, 24b, 24c, 24d (e.g. that corresponding to axis q6) is an actuated joint and can be either left free or be controlled, allowing to maintain the user's hand in a functional posture (e.g. for grasping tasks), whereas the remaining joints 24 (corresponding to axes q4 and q5) are left unactuated. This unactuated spherical joint means that the general posture of the user arm is not physically regulated. This may be an advantage when clinical practitioners encourage active and conscious participation (of the user) in the correction of movement postures, and physical restraints can increase the risk of injury.

The spherical joint is instrumented with potentiometers (not shown), to allow measurement of the angular rotation of the wrist, but in this embodiment unactuated, so that the user will be free to rotate the orientation of the wrist freely. The spherical joint implemented by revolute joints 24a, 24b, 24c, 24d has axes of rotation q4, q5, q6, q7 that intersect at the centre of the joint (e.g. the centre of the splint).

Although not depicted in this figure, device 10 also includes a control system for controlling the actuated mechanical system 18 to apply a force to wrist unit 16 in a selected direction.

Figure 2A:
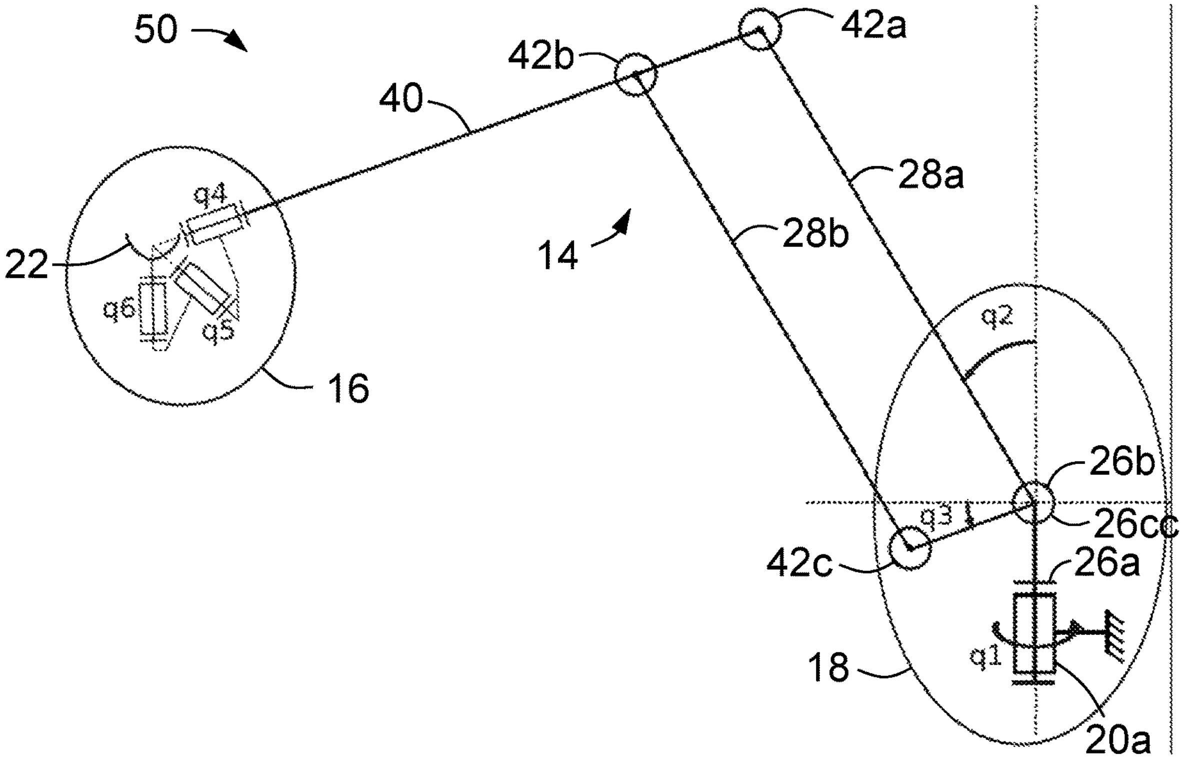
FIGS. 2A and 2B are schematic views of the kinematic structure of the device of FIGS. 1A and 1B.
Figure 2B:
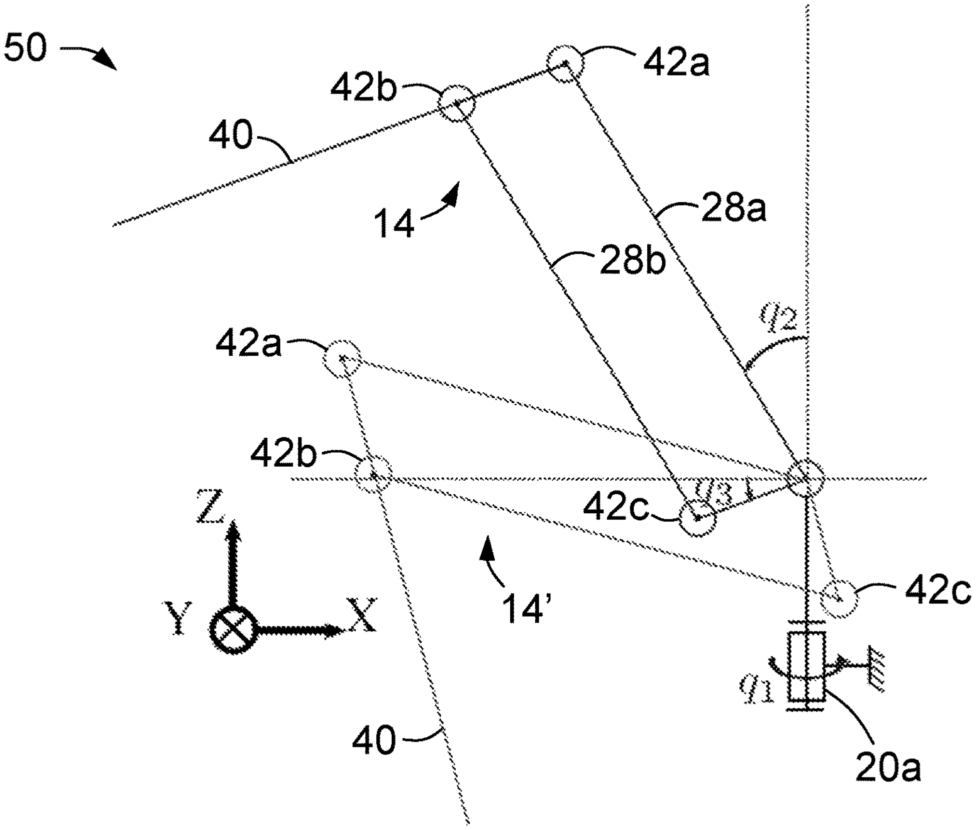
Figure 2C:
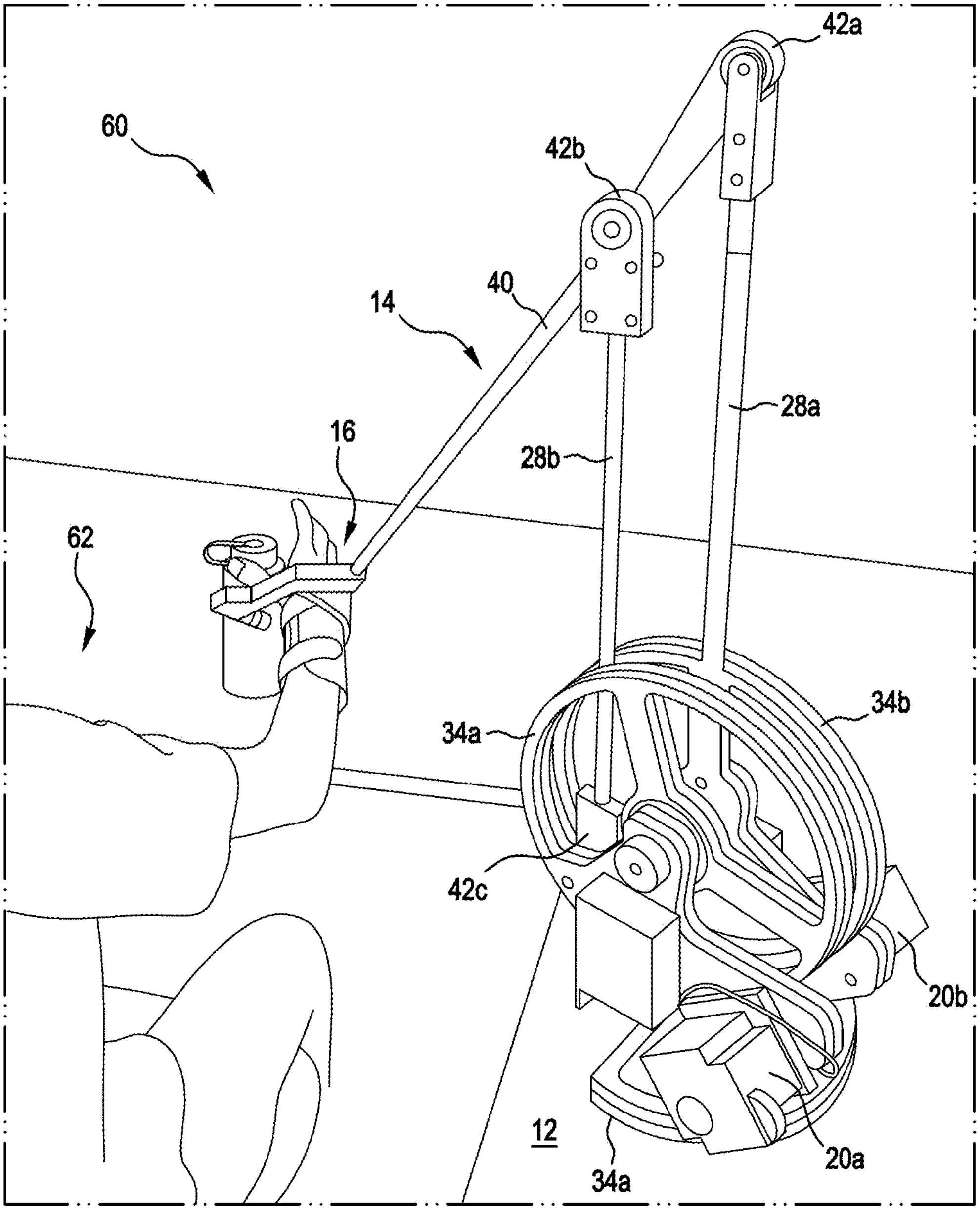
FIG. 2C is a photograph of a prototype device constructed according to the embodiment of FIGS. 1A and 1B, with a user.

FIGS. 2A and 2B are left schematic views of the kinematic structure 50 of device 10, and correspond approximately to the view of FIG. 1A. FIG. 2B omits wrist unit 16 for clarity, and illustrates passive arm 14 in two different orientations (shown at 14 and 14'). FIG. 2C is a photograph of a prototype device 60 constructed according to this embodiment, with a user 62: like reference numerals have been used to indicate like features.

Mechanical Design: Kinematics

According to an embodiment, the wrist unit 16 is provided with six Degrees-of Freedom (DOF) in its movement. Of these, the first three DOF (axes q1 to q3) are actuated. These DOF are associated with the actuated mechanical system 18 and provide for translation of the wrist unit 16. The first axis q1 corresponds to rotational about a vertical axis. The second axis q2 and third axis q3 actuate the 4-bar linkage arrangement of the parallel mechanism of arm 14, which corresponds to movement in the vertical plane, as positioned by first axis q1 (cf. FIGS. 2A and 2B). This allows most of the motor inertia to be located at base 12 of device 10, reducing the effective moving inertia of the robot. It should be understood that the term "vertical" is used herein for ease of description; more generally, the vertical axis can correspond to any suitable axis as necessary.

The user's wrist is connected to device 10 utilising wrist cuff 22 or a splint. Typically, the centre of the wrist corresponds to end-effector point and centre of rotation of the passive ball-joint (which may be similar to that proposed in [10]). The spherical joint and splint are typically designed so that the user's hand is left free; this facilitates direct interaction with physical objects, as context is important in effective rehabilitation exercises [11]. In an embodiment, device 10 includes potentiometers (described below) for measuring the rotations of the passive joints q4 to q7 providing signals indicative of the patient's forearm pose (i.e. wrist position and forearm orientation). This unactuated spherical joint means that the general posture of the user arm is not physically regulated. This is may be advantageous as clinical practitioners often encourage active and conscious participation (of the user) in the correction of movement postures, and physical restraints can increase the risk of injury.

Figure 3B:
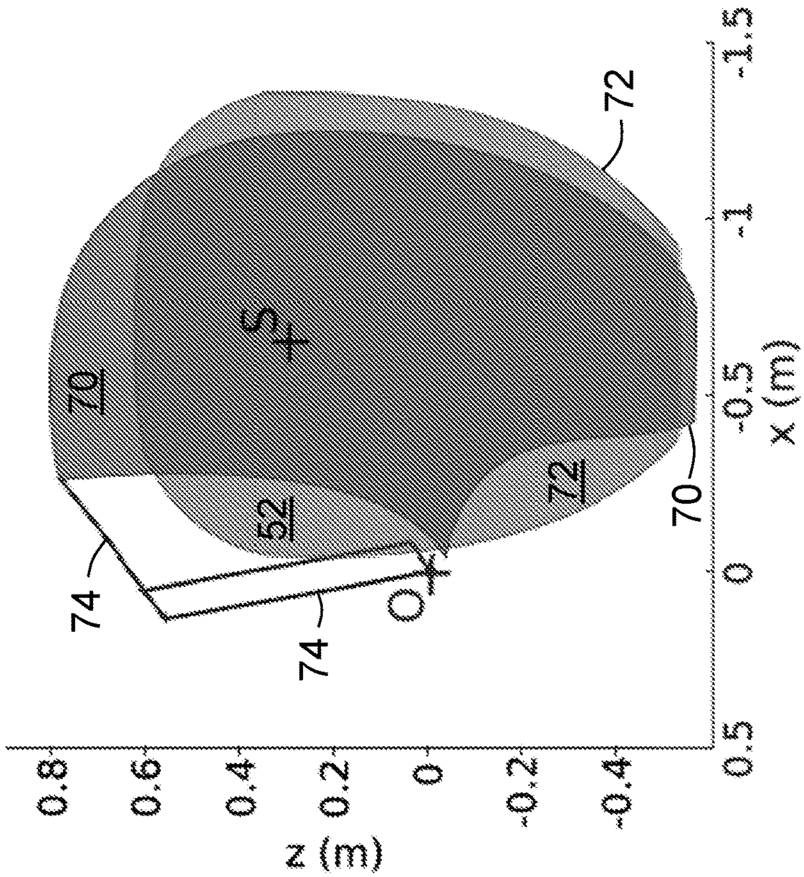
FIGS. 3A and 3B are top and right views respectively of the system workspace of the device of FIGS. 1A and 1B and human arm workspace, fora user with limb lengths of 0.34 m and 0.27 m.
Figure 3A:
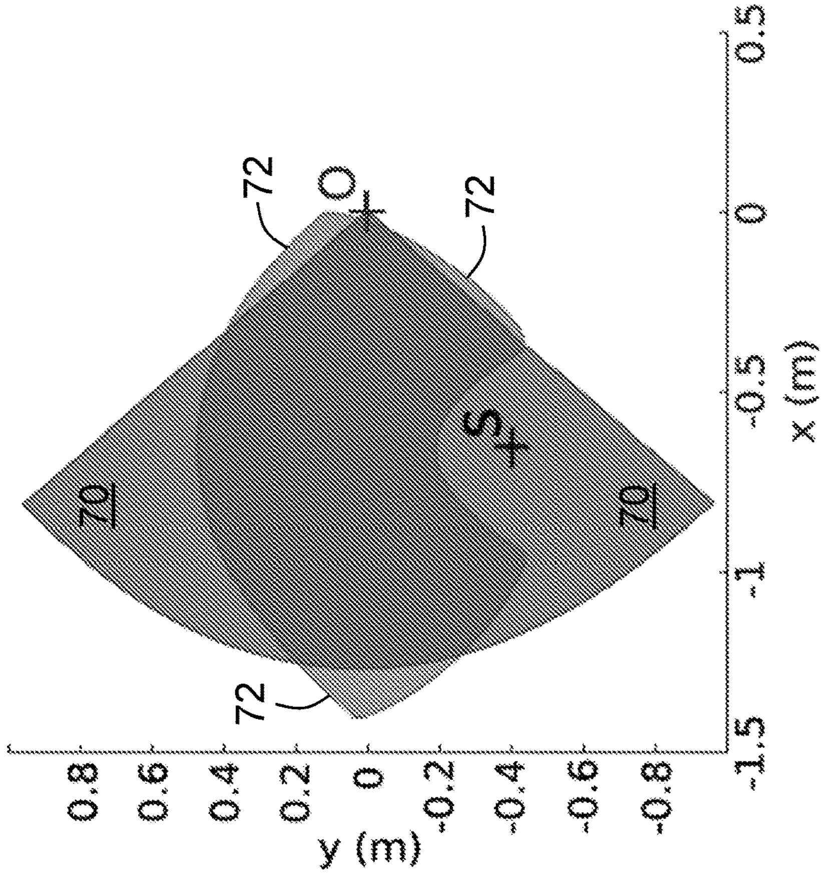

In an embodiment, as discussed above, the lengths of the links provided by beams 28a, 28b, 40 are selected to allow for access to a workspace volume of 0.8 m×0.8 m×1 m, covering a large portion of the human wrist workspace. FIGS. 3A and 3B are top and right views, respectively, of the system workspace 70 and human arm workspace 72 of device 10, fora user with limb lengths of 0.34 m and 0.27 m [12]. Points (O) and (S) respectively denote the robot origin and user shoulder position. One extreme configuration 74 of device 10 is shown on the front view of FIG. 3B. Notably, system workspace 70 includes a substantial portion of the human arm workspace 72.

Mechanical Design: Actuation and Transmission

In an embodiment, the three actuated axes are each driven through a capstan transmission, directly by a DC motor (without a gearhead). The capstan arrangement provides, for example, a 23:1 gear ratio through sizing of the capstan wheel and a bushing mounted on the motor shaft. Advantageously, device 10 may achieve a relatively high torque capability while preserving backdrivability.

The bushing can be threaded on its external surface, allowing the capstan wire to sit in the groove of the thread. This advantageously has lower friction compared to geared or belt-driven options as there is no rubbing component in the motion. The parallel structure—and subsequent position of the motors—advantageously further reduces the inertia of the device and allows the use of high power (and heavy) motors. Finally, it is preferred that the moving arms constituting semi-parallel passive arm 14 are constructed out of light-weight, hollow, aluminium tubes.

Figure 21:
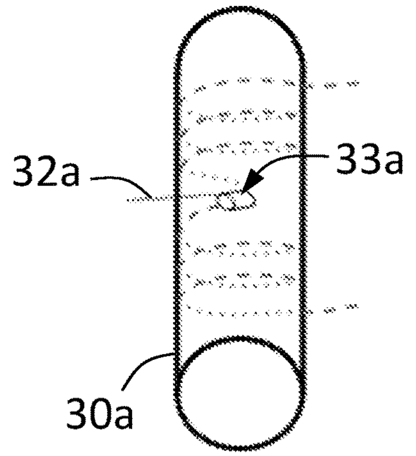
FIG. 21 depicts an arrangement of a bushing and its associated position transmission wire according to an embodiment.

FIG. 21 shows a feature of the capstan transmission mechanism according to an embodiment. The bushing 30a associated with the first joint 23a is shown. The transmission wire 32a associated with this bushing 30a is secured to the bushing. In the embodiment shown, the transmission wire 32a is thread through a hole 33a in the bushing 30a (e.g. running through a centre axis of the bushing). The through hole 33a preferably extends through (or substantially close to) a centre axis of the busing 30a. Alternatively, or in addition, the transmission wire 32*a* can be fixedly secured to the bushing 30*a* using a fastening means, for example by using a grub screw (not shown). An advantage of this embodiment can be reduction or elimination of slip of the transmission wire 32*a* during operation of the capstan transmission mechanism. Another advantage is that the reduction or elimination of slip may be effected with a smaller contact region between the transmission wire 32*a* and the bushing 30*a*. Generally, according to the embodiment, any one or more of the bushings 30*a*, 30*b*, 30*c*, and preferably all of the bushings 30*a*, 30*b*, 30*c*, can have its associated transmission wire 32*a*, 32*b*, 32*c* fixedly secured as described.

Figure 22:
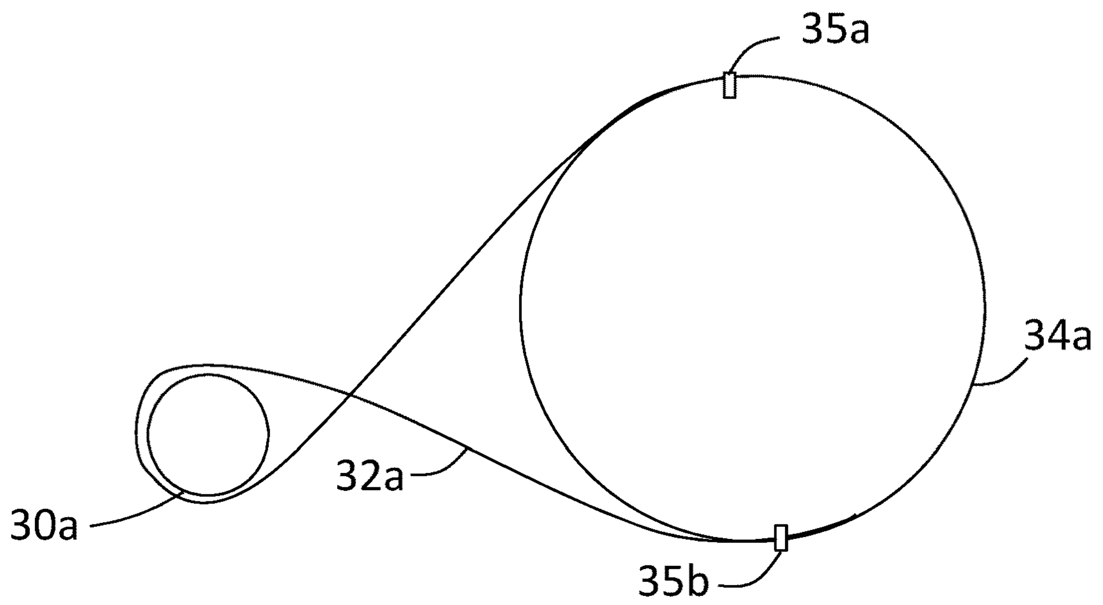
FIG. 22 depicts an arrangement a bushing, capstan wheel, and transmission wire.

FIG. 22 shows a feature of the capstan transmission mechanism according to an embodiment. The bushing 30*a* and the capstan wheel 34*a* associated with the first joint 23*a* are shown. According to the embodiment, the ends of the position transmission wire 32*a* are fixedly secured at secure points 35*a*, 35*b* to the first capstan wheel 34*a*.

In an embodiment, each axis q1 to q3 is powered by a 86BL71 brushless motor (Fulling Motor) with nominal torque of 0.7 Nm and peak torque of 2.1 Nm, driven by a Copley 503. Each capstan has a reduction ratio of 300/13=23, leading to a peak output torque of 48.5 Nm for corresponding each joint 26*a*, 26*b*, 26*c*. This embodiment provides an average maximum force wrist unit 16 force of 48 N in the horizontal plane and 38 N in the vertical plane in its usable workspace. The average maximum force may be adjusted in other embodiments through resizing of the motors or capstan arrangement. However, the arrangement of this embodiment is sufficient to support the arm of a 80 kg user (as discussed below).

In another embodiment, each axis q1 to q3 is powered by a 86BL98 brushless motor (Fulling Motor) with nominal torque of 1.4 Nm and peak torque of 4.2 Nm, driven by an Electrocraft CPP-A12V80. Each capstan has a reduction ratio of 300/13=23, leading to a peak output torque of 96.6 Nm for corresponding each joint 26*a*, 26*b*, 26*c*. This embodiment provides an average maximum force wrist unit 16 force of 90 N in the horizontal plane and 76 N in the vertical plane in its usable workspace. The average maximum force may be adjusted in other embodiments through resizing of the motors or capstan arrangement. However, the arrangement of this embodiment is sufficient to support the arm of a 140 kg user (as discussed below).

Electrical, Electronic and Software Design

In an embodiment, device 10 utilises a CompactRIO or sbRIO real-time embedded industrial controller (National Instruments, USA), which includes a microprocessor running Real Time (RD Linux, and Input/Output channels connected through an FPGA. This controller is connected via Ethernet to a host computing device, which runs user interface software. Analogue Outputs (AO) are used to command the motor drives. Device 10 has incremental encoders fitted on each motor shaft; these incremental encoders are connected via high speed Digital Inputs (DI). Each axis q1-q7 is also fitted with a potentiometer, providing absolute angular measurement of each of the 6 axes, which are connected to Analogue Inputs (AI).

Figure 4:
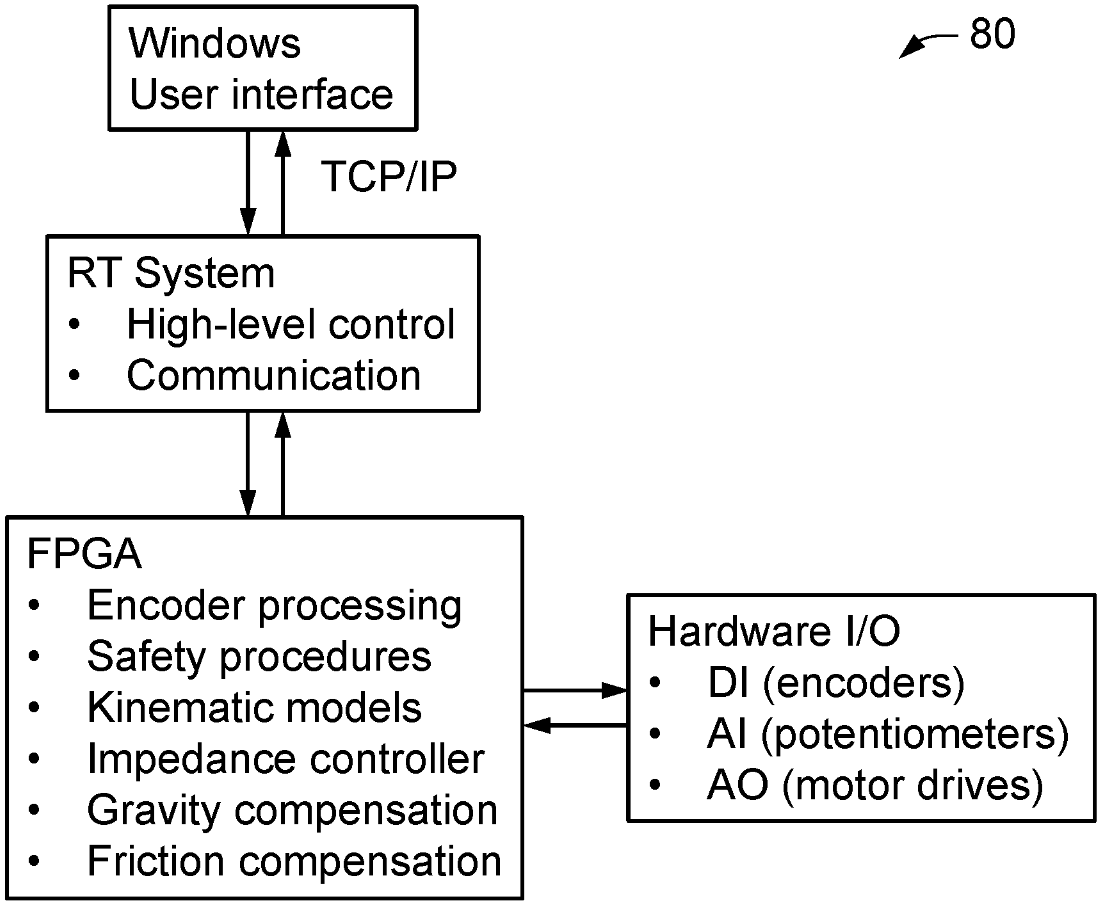
FIG. 4 is a schematic view of the software and electronic architecture of the device of FIGS. 1A and 1B.
Figure 5A:
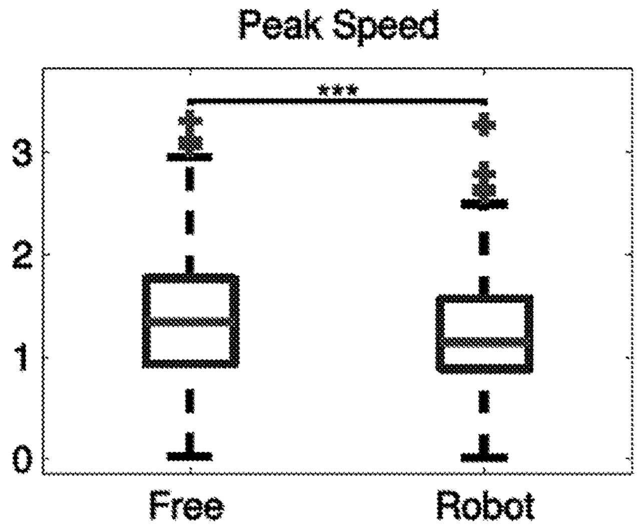
FIGS. 5A to 5E illustrate the change in metrics Peak Speed, Time of Peak Speed (TTP), Smoothness, Curvature and Accuracy between movements performed within the prototype device of FIG. 2C, and when the same movements are performed outside the prototype device of FIG. 2C.
Figure 5B:
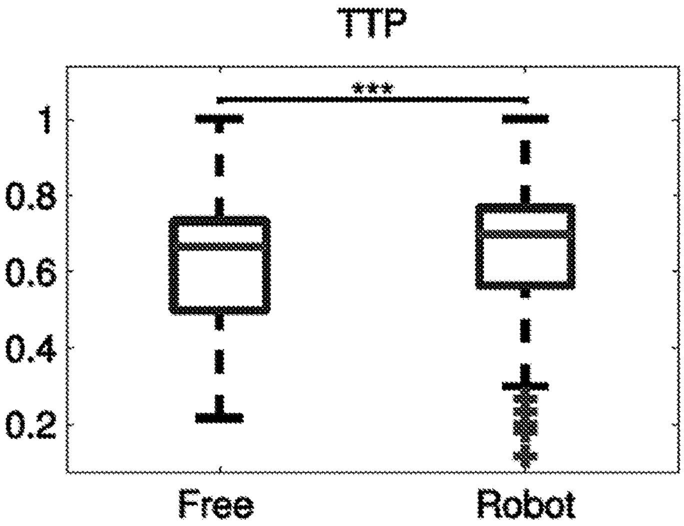
Figure 5C:
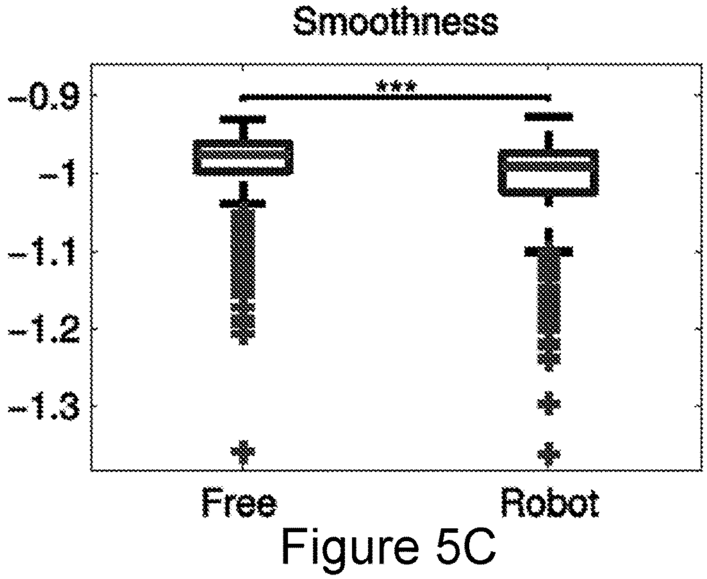
Figure 5D:
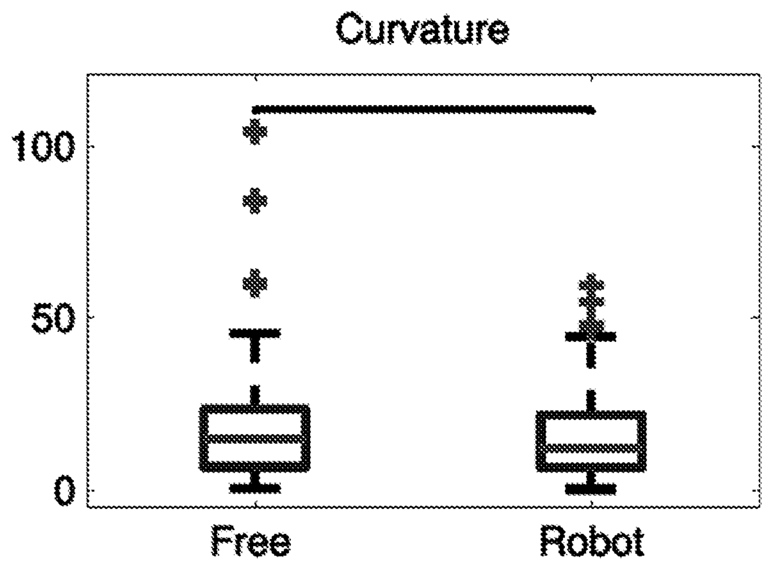
Figure 5E:
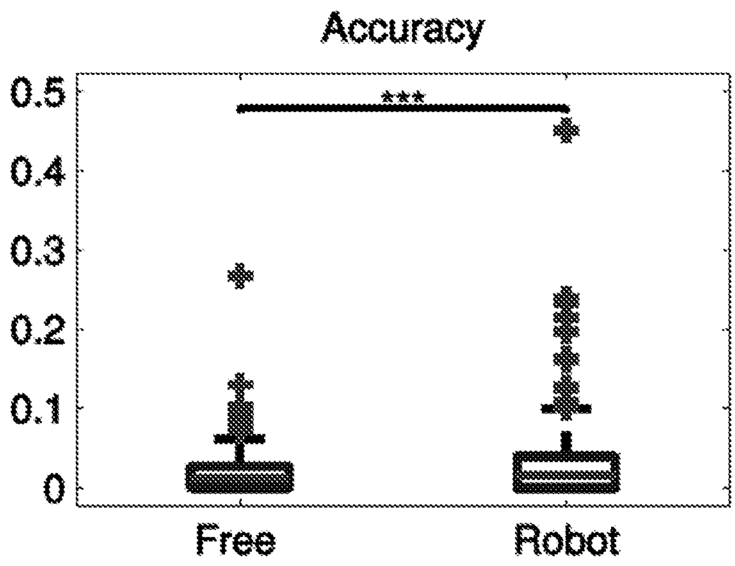

The software is designed in a hierarchical manner, with higher priority time-critical processes running on faster, deterministic hardware and deterministic software threads, and lower priority tasks running as non-RT software on the host computer. This arrangement is depicted at 80 in FIG. 4. Specifically, the software limits (angular, velocity and torque limits), the open-loop (feedforward) gravity and friction compensations [13] and an impedance controller [14] run at 10 kHz on the FPGA whereas higher level controllers (including path and trajectory planners) run at 1 kHz on the RT controller. A Personal Computer running Windows OS (Microsoft, USA) is used as a host PC for the user interface. The software was written in LabVIEW (trade mark).

Examples

I. Transparency Evaluation

The role of a robotic device in neurorehabilitation is to impart force onto the user whilst they attempt to complete a movement, in order to encourage the use of certain movement or muscle activation patterns. Prototype device 60 was constructed to be as mechanically transparent as possible, to minimize the application of unintentional forces lest such unintentional forces promote unintended movement patterns within the user.

A known method of evaluating transparency involves the use of a force and torque sensor to measure the forces applied at the end-effector when a given motion is performed. In this case, the smaller the magnitude (of the force and torque), the better. Alternatively, within the context of rehabilitation of the upper limb, transparency can also be evaluated by having human users perform reaching actions while they are attached and not attached to the rehabilitation robot. The trajectories of the movements in these two conditions can then be compared. In an ideal case, the trajectories for the same intended motion would be identical, that is, device 10 does not affect the movements of the users. Previous similar studies on an existing rehabilitation device have highlighted how significantly the movement patterns may change [15], [16], [17]. Herein, the latter approach was employed to evaluate the transparency of prototype device 60.

A. Experimental Methods

Five healthy users were involved in the experiment after providing an informed consent. A similar protocol to the one utilised by the authors of [16] was then used. Users were asked to reach to virtual targets in two conditions: in prototype device 60 and out of prototype device 60. Magnetic sensors (3d Guidance trakSTAR, Ascension Corp) were attached to the user's elbow and wrist. The position of the wrist was mapped to a virtual cursor, and users were asked to reach from a fixed starting position (in the sagittal plane in line with the shoulder, with elbow flexed to approximately 45 degrees) to one of six targets—directly forward, to the left and to the right, and the same with a vertical elevation. The users were asked to reach each target in one second.

Two conditions were tested:

(1) the user completely free to move, not in any way connected to prototype device 60, with only the magnetic sensors attached ("Free"); and (2) the user attached to prototype device 60 using the wrist splint ("Robot"), where prototype device 60 was set to its transparent mode (i.e. compensation of its own weight and friction).

Each user reached to each target 10 times in both conditions. The order in which the conditions were presented was randomised between users.

The effect of prototype device 60 on user performance was measured using five metrics dependent on wrist position only, as described in [16]: (1) Peak Speed: the largest speed (as calculated in real-world coordinates, using a first-order Euler approximation on the position data); (2) Time of Peak Speed: the time of the peak speed relative to the start of the movement; (3) Smoothness: Spectral Arc Length (SAL) Smoothness as defined in [18]; (4) Curvature: measured as the integral of the distance of the reaching trajectory from a straight line connecting the home position and the final position (at t=1 s); and (5) Accuracy: defined as the shortest distance of the cursor to the target in virtual coordinates at t=1 s.

These metrics were chosen for their relevance to rehabilitation [19]. The metrics were evaluated in two ways. First, a Wilcoxon Signed Rank Test was used to compare the movements in the "Free" versus the "Robot" conditions. Secondly, a comparison between the data presented here for prototype device 60 and those for using the ArmeoPower (Hocoma, Switzerland) as presented in a previous work [16].

B. Experimental Results

FIGS. 5A to 5E illustrate the change in metrics Peak Speed, Time of Peak Speed (TTP), Smoothness, Curvature and Accuracy, respectively, with respect to the two reaching conditions, by comparing metrics between movements performed within prototype device 60, and when the same movements are performed outside prototype device 60. It is noted that performing the actions within prototype device 60 does affect a significant difference in the movement patterns illustrated by these metrics. "***" indicates significant difference with probability $p<0.001$.

Figure 6:
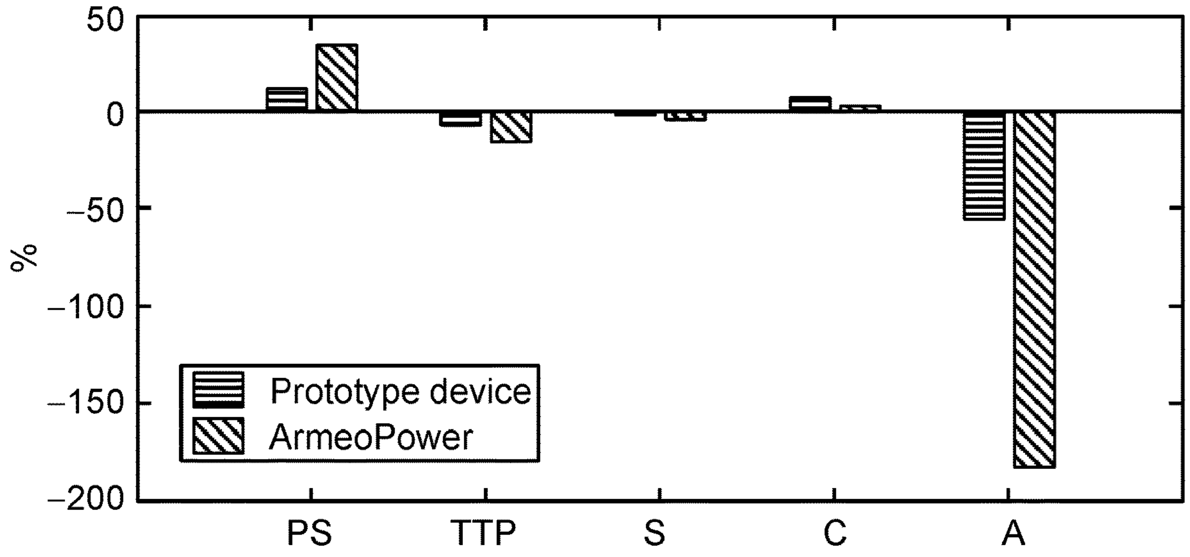
FIG. 6 shows a comparison of change in metrics (percentage) when performed within the prototype device of FIG. 2C, and when performed within the ArmeoPower (trade mark)

FIG. 6 illustrates the percentage change from "Robot" to "Free" for the ArmeoPower and prototype device 60, for metrics Peak Speed (PS), TTP, Smoothness (S), Curvature (C) and Accuracy (A). It can be seen that prototype device 60 affects the metrics less in all metrics, with the exception of curvature, suggesting that prototype device 60 provides a more mechanically transparent environment for rehabilitation.

Movements made within prototype device 60 were found to be different compared to those made outside it. However, these changes were relatively small, with Peak Speed, Time to Peak Speed, Smoothness and Curvature affected by less than 15%. Accuracy is affected more significantly, with a 50% decrease. However, the absolute change is in the order of 3 mm in magnitude. The limited effect on these metrics suggests that, although the users were aware of being attached to prototype device 60, its effect was minor. Despite this, these changes are not directly the result of the forces; the users are likely to have, in some way, accommodated for the interaction forces, and/or changed their movement patterns slightly owing to the change in context. Regardless, these small effects indicate that the interaction forces are minimal; at the very least the users are capable of easily overcoming these forces to 'correct' for the changes.

Comparisons were also made with the commercially available rehabilitation (active) exoskeleton ArmeoPower. In this comparison, it can be seen that the changes in the metrics introduced by prototype device 60 are two to four times lower than the ArmeoPower. There are a number of reasons for this. Firstly, the ArmeoPower is a full exoskeleton, and thus is attached to the arm at multiple points. This provides additional locations at which force can be imparted on the user, causing changes in the movement patterns. Secondly, the ArmeoPower's serial structure naturally leads to a heavier system and thus more inertia which must be compensated for, particularly in the relatively fast movements considered here. Prototype device 60 has most of its mass located at its base, so less mass to be moved when the arm moves, again reducing the force applied to the user's arm.

The study thus showed that the movements are affected when using prototype device 60 compared to those made in free reaching conditions, but the design of prototype device 60 leads to a significantly smaller effect than exoskeleton-based rehabilitation robotic devices (in this case, represented by the Armeo Power), allowing more refined interactions with the users and a greater capability to detect or react to movement contributions.

II. Gravity Compensation

A known and useful feature amongst rehabilitation robots is the ability to 'de-weight' the arm [20], such that the force threshold for movement is lower—that is, the muscles do not need to overcome the weight of the arm first, before the arm accelerates.

A. A 3D Manipulandum Specific Problem

The construction of device 10 affects how gravity compensation must be achieved. For example, horizontal planar manipulanda do not require active gravity compensation—the structure of the device itself restricts movement in the vertical direction. On the other hand, exoskeletons require active compensation. This compensation can be achieved by estimating the mass of each arm segment (upper arm, forearm, hand), and compensating for the associated gravitation force with torques at each robotic joint.

By design, a three-dimensional manipulandum only provides directional force at one point on the patient's arm. As a result, the approach taken for gravity compensation involves calculating and applying the force at this one point to cancel the torque required by the shoulder to counteract the weight of the arm.

Figure 7:
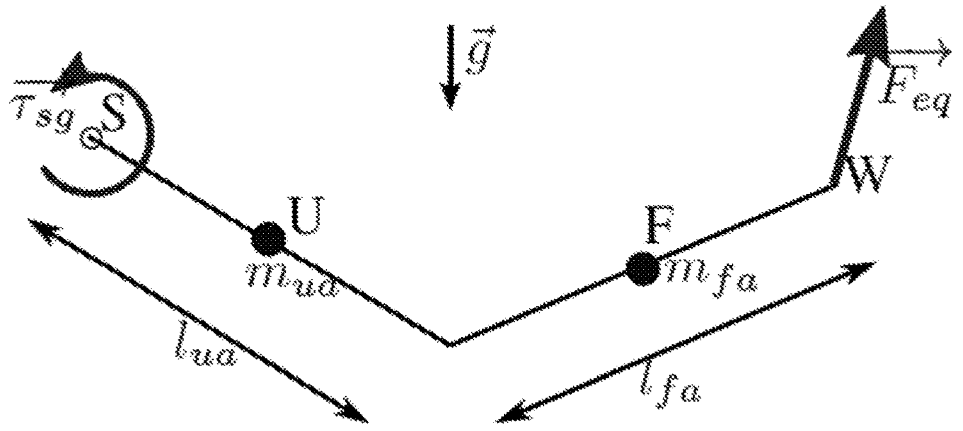
FIG. 7 is a schematic representation of the human arm as a two link mechanism in the sagittal plane.

Within this analysis, the arm is modelled as a fixed two-link mechanism, upper-arm and forearm, with respective lengths $I_{ua}$ and $I_{fa}$. Each link is assumed to be a point-mass, centred along the link at points U and F, respectively noted $m_{ua}$ and $m_{fa}$. FIG. 7 is a schematic representation of the human arm as a two link mechanism in the sagittal plane. W represents the location of the wrist, $\vec{\tau}_{sg}$ is the shoulder torque required to support the arm weight, and $\vec{F}_{eq}$ an 'equivalent' force applied by the robot.

The shoulder torque $\vec{\tau}_{sg}$ required to support the weight can be expressed as:

$$\vec{\tau}_{sg}=m_{ua}\vec{SU}\times\vec{g}+m_{fa}\vec{SF}\times\vec{g} \quad (1)$$

It is noted that the required shoulder torque is variable and dependent on the arm posture. Thus, to compute the appropriate gravity-compensation force, the system needs to measure this posture and not only the forearm pose. This can be achieved in a number of ways using external sensors (such as IMUs, RGBD cameras or magnetic sensors such as those used in the experiments presented in Section III).

B. Proposed Gravity Compensation

In order for the 3D manipulandum to compensate for the shoulder torque $\tau_{sg}$, the equivalent force $\vec{F}_{eq}$ which must be applied at the end-effector point (i.e. the wrist center W) must satisfy:

$$\vec{\tau}_{sg}=\vec{SW}\times\vec{F}_{eq} \quad (2)$$

The solution of the minimal norm is given by:

$$\overrightarrow{F_{eq}} = \frac{\overrightarrow{\tau_{sg}} \times \overrightarrow{SW}}{\|\overrightarrow{SW}\|^2} = \frac{(m_{ua}\overrightarrow{SU} \times \vec{g} + m_{fa}\overrightarrow{SF} \times \vec{g}) \times \overrightarrow{SW}}{\|\overrightarrow{SW}\|^2} \tag{3}$$

Figure 8A:
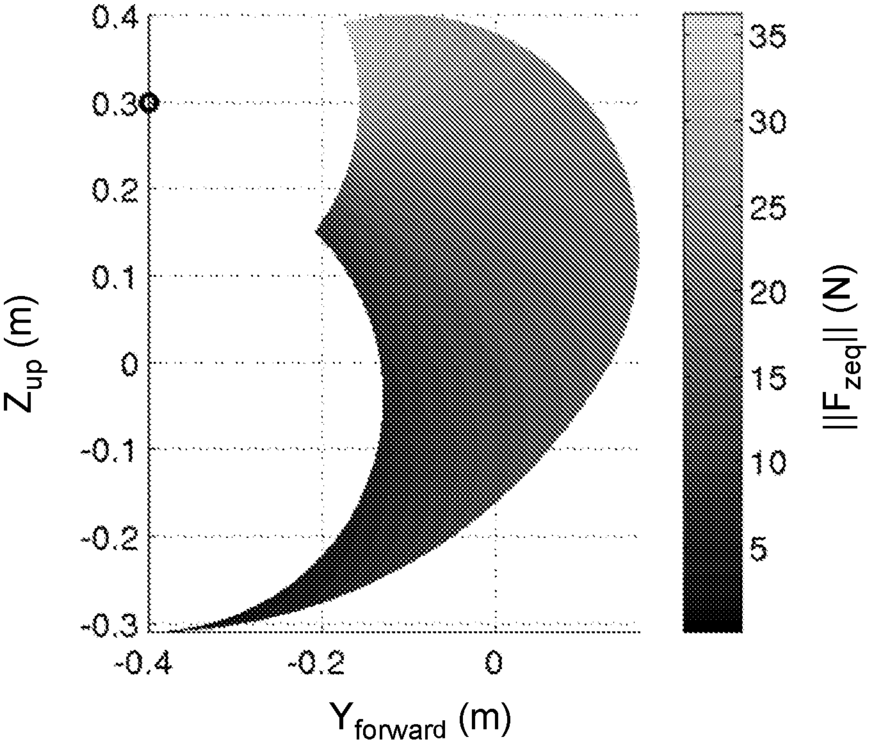
FIGS. 8A and 8B are plots of the magnitude of gravity compensation force required of the prototype device of FIG. 2C at its end-effector when applied to point W in FIG. 7, and the difference between required vertical force and maximal vertical robot force at that point, respectively.

This theoretical analysis indicates that the magnitude and direction of the gravity compensation force $\overrightarrow{F_{eq}}$ is dependent on both the arm parameters (lengths and masses) and posture. FIG. 8A shows the magnitude of the gravity compensation force required of device 10 at its end-effector when applied to point W in FIG. 7, as an example of how this equivalent force varies whilst the wrist is moving in the sagittal plane in line with the shoulder, for arm parameters ($I_{ua}$=0.34 m, $I_{fa}$=0.27 m and $m_{ua}$=$m_{fa}$=2.2 kg, corresponding to the arm mass of a 80 kg average adult). In both FIGS. 8A and 8B, the circle represents the shoulder point.

Figure 8B:
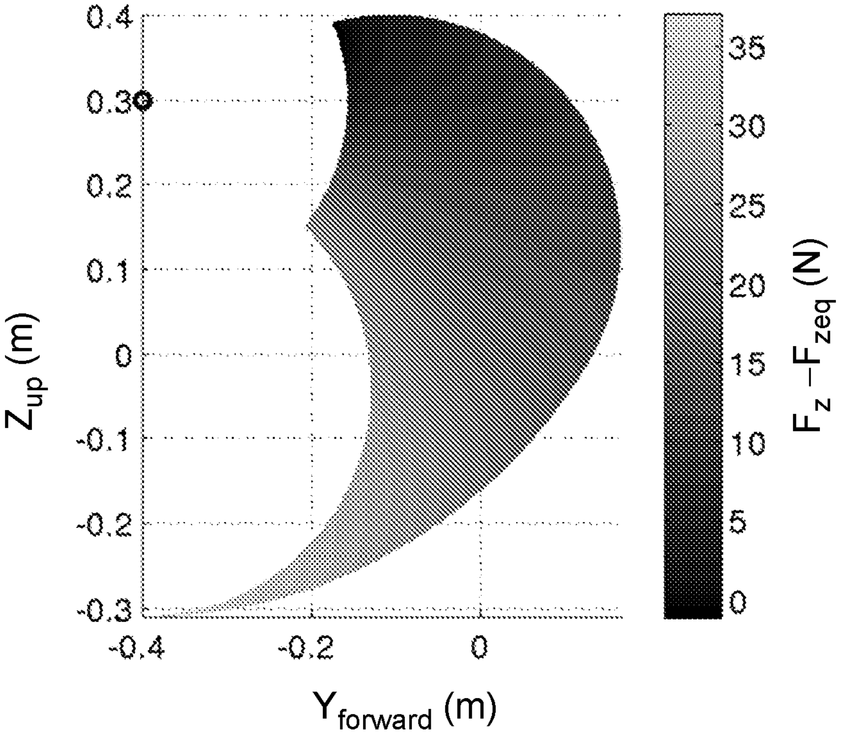

For these parameters, the required gravity compensation force ranges from 0 N to 38 N even in this restricted workspace, indicating the importance of taking into account the human arm posture when providing the gravity compensation. FIG. 8B shows the difference between the required vertical force and the maximal vertical robot force. FIG. 8B provides an indication that the capability of the current prototype is sufficient to produce this force. The proposed solution thus suggests a method of providing arm gravity compensation for 3D manipulanda such as device 10, given that the upper-limb posture is known.

According to another embodiment, however, there is provided an electromechanical robotic manipulandum device for upper-limb rehabilitation (comparable to device 10) having an alternative deweighting mechanism. The system of interest can be characterized as comprising two components: (1) the robotic device providing the deweighting force, and (2) the upper limb, whose weight and dynamics are to be compensated for. The two components are connected by having the upper limb strapped onto the end-effector (cf. wrist unit 16) of the robotic device. In the following discussion, the type of robotic device under consideration is described, a model of a human arm is constructed, and a definition of 'deweighting' is proposed.

A. Robotic Device

The robotic device considered herein is a 3-dimensional end-effector based device, often referred to as a manipulandum and comparable to device 10 of FIGS. 1A and 1B. The characterizing features of such a device (as opposed to an exoskeleton) are that it is attached to the human arm at a single location, and allows movement in three-dimensional space. The forces $f_r$ and moments $m_r$ applied to the human arm are treated as regulatable by the robotic control strategy of this aspect of the invention, either through impedance or admittance control. In the case where the forces and moments in all directions can be applied, these have dimension $f_r \in \mathbb{R}^3$ and $m_r \in \mathbb{R}^3$, but it is not assumed that all devices under consideration have this property.

Manipulandum device 10 of FIGS. 1A and 1B is an example of such a system, having 3 degrees of actuation, capable of producing only the translational forces at the contact location. It allows movement of the forearm in 6 DOF; the orientation degrees of freedom (the remaining 3 joints) are not actuated but, rather, instrumented with angular displacement sensors. Hence, the following description identifies device 10 as the robotic device that, in this embodiment, is additionally provided with a deweighting mechanism.

B. Arm Model

The human arm is modelled as a two link serial (Spherical-Revolute) mechanism. It consists of a shoulder joint, which is modelled as a spherical joint (3DOF with a common intersection of all three rotational axes) and a revolute elbow joint. The two rigid links therefore consist of the upper-limb (or upper-arm in the human example) and forelimb (or forearm in the human example) with associated masses $m_{ua}$ and $m_{fa}$, respectively.

Figure 9:
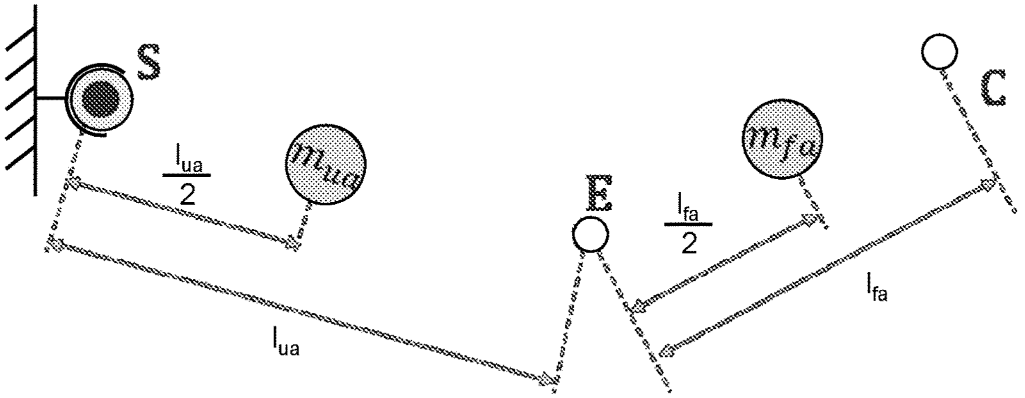
FIG. 9 depicts a mathematical approximation of an upper limb model.
Figure 10:
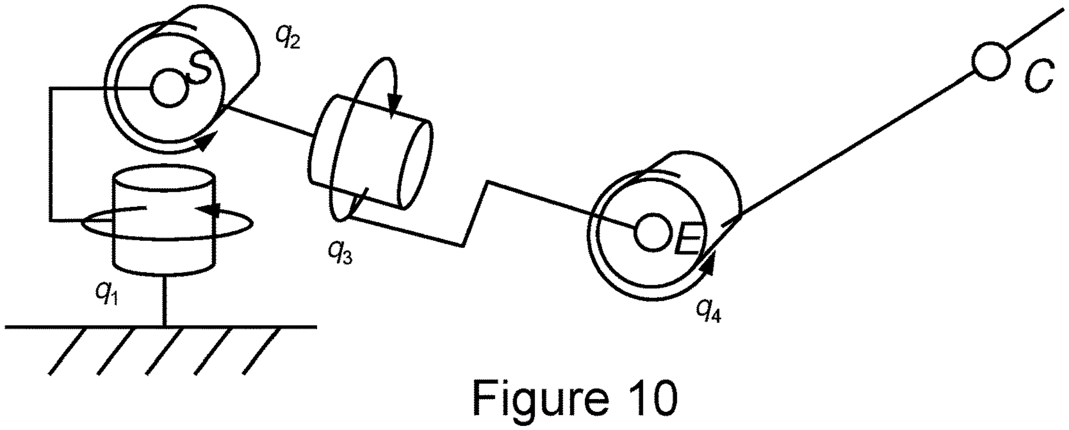
FIG. 10 is a representation of an upper limb as modelled according to the International Society of Biomechanical (ISB) recommendations.

FIG. 9, like FIG. 7, depicts a mathematical approximation of the upper limb model, in the form of a two link model with a spherical joint at the shoulder S and a revolute joint at the elbow E. The upper-limb (e.g. upper arm) and the forelimb (e.g. forearm) are approximated by two links of lengths $I_{ua}$, $I_{fa}$ and masses $m_{ua}$,$m_{fa}$ (treated as located at the limbs' mid-points), respectively. It is assumed that the location of the shoulder S is known in inertial space, allowing for a quasi-static update of its location. The wrist joint is not considered, as device 10 is assumed to be connected to the end of the forearm of the subject. Mathematically, the shoulder and elbow joints are modelled as per the International Society of Biomechanical (ISB) recommendations [28]; FIG. 10 represents the upper limb as modelled in this manner, with three rotational joints $q_2$, $q_3$ at the shoulder, and one rotational joint $q_4$ at the elbow. Whilst this model does not give a complete representation of all possible degrees of freedom in the upper limb, it models the degrees of freedom with the greatest ranges of motion in the upper limb, and thus provides a suitable model for this aspect of the invention.

The equations of motion of the human arm according to this model can be written as:

$$M_h(q_h)\ddot{q}_h + C_h(q_h,\dot{q}^h)\dot{q}_h + g_h(q_h) = \tau_h \tag{1}$$

where $q_h$, $\dot{q}_h$ and $\ddot{q}_h \in \mathbb{R}^n$ are the generalized coordinates of the upper limb and their derivatives, and $\tau_h \in \mathbb{R}^n$ is the joint torque generated by the subject (through activation of its muscles); $M_h(q_h) \in \mathbb{R}^{n \times n}$ is the inertia matrix, $C_h(q_h, \dot{q}_h) \in \mathbb{R}^{n \times b}$ is the Coriolis and centrifugal matrix, and $g_h(q_h)$ is a vector corresponding to the gravitational terms. In the model used within this work, n=4. It should be noted that these equations are described with a subscript h (to denote human, the animal considered in this example) to distinguish these variables from those attributed to the robotic device.

C. Deweighting

When device 10 is combined with the model of the upper limb, the generated end-effector force ($f_r$) and moment ($m_r$) are applied to the upper limb at point C. This provides an additional force to the dynamics of device 10, which can be adjusted through the robotic control strategy. As a result, the dynamics are modified to:

$$M_h(q_h)\ddot{q}_h + C_h(q_h,\dot{q}_h)\dot{q}_h + g_h(q_h) = \tau_h + R_r(f_r, m_r) \tag{2}$$

where $R_r$, ($f_r$, $m_r$) describes the effect of the robot force and moment on the upper limb.

The upper limb deweighting uses the robotic force $f_r$ and moment $m_r$ to compensate the effect of gravity $g_h(q_h)$ such that zero torque is required at the shoulder and elbow joints to maintain a given pose of the upper limb. Partial deweighting is possible and would result in some remaining torque at the shoulder and elbow joints. It is noted that such a reduction in the required torque is akin to reducing the amount of muscle force required to compensate for this weight.

III. Deweighting Control Strategy

Within this section, a deweighting control strategy is presented for the general class of joint torque commanded 3D manipulanda, capable of producing a command end-effector wrench. This presents a unique problem definition in the use of a Jacobian matrix (pertaining to the upper limb). The problem requires the identification of the end-effector forces (now considered as the actuation) to produce the desired torque at the joints (which is zero). This is in contrast to the common robotic Jacobian matrix that relates the actuated joint space to the task defined at the end-effector space.

A. General Case 6DOF Robotic Mechanisms

In order to compensate for the torques of the upper limb joints due to gravity $g_h(q_h)$, the robotic manipulandum provides an appropriate force ($f_r$) and moment ($m_r$), at the contact location.

From Equ. (2), it can be stated that:

$$R_r(f_r,m_r)=g_h(q_h), \tag{3}$$

which is the end-effector force and moment that device 10 needs to produce.

This force and moment can then be calculated from the model of the upper limb as:

$$\begin{bmatrix} f_r \\ m_r \end{bmatrix} = J_h^{T\#}(q_h)g_h(q_h) \tag{4}$$

where $J^{T\#}_h(q_h)$ is the generalized inverse transpose of the human arm Jacobian and is given by (see [29]):

$$J_h^{T\#}(q_h)=(J_h(q_h)M_h^{-1}(q_h)J_h^{-1}(q_h))J_h(q_h)M_h^{-1}(q_h) \tag{5}$$

The upper limb Jacobian matrix is of dimension 6 by 4, where 6 is the dimension of the end-effector space while 4 is the number of the upper limb joints considered in the model. It should be noted that, from the perspective of the upper limb, the end-effector is what is being actuated while the joint space of the upper limb is the motion being regulated. As a result, the system is redundant.

It should also be noted that the generalized inverse above is the dynamically consistent inverse, and takes into account the effect of the task space inertia matrix that results in zero acceleration at the end-effector due to any torque projected into the null space of device 10. This provides a generic methodology for providing deweighting with any end-effector based device with full actuation in both force and moment. In such a case, the Jacobian is full rank at postures other than singularities, so the effects of $g(q_h)$ can be entirely compensated for. This also has consequences with respect to application of other joint-based control strategies, which may also be implementable in such end-effector based devices.

This result suggests that a 3D end-effector based robotic device can essentially completely compensate for the effects of gravity on the dynamics of a subject's upper limb, thus providing this capability with a device arguably less complex in its mechanical design than an exoskeleton.

B. On Underactuated Robotic Device: Application to an Example of Device 10

In the interest of simplifying the robotic mechanism used for upper limb rehabilitation, the application of the deweighting strategy on an underactuated robot such as device 10 is now considered. Device 10 has 3 degrees of actuation, capable of regulating the translational degrees of freedom of the end-effector. A spherical joint is placed at the end-effector (wrist unit 16), which is instrumented with angular displacement sensors.

In this case, the Jacobian matrix is rewritten to consider only the translational force components of the end-effector (as the actuation), while still regulating the 4 joints considered in the model of the upper limb. The resulting end-effector force that device 10 has to produce to achieve deweighting is therefore:

$$f_r=J_h^{T\#}(q_h)g(q_h). \tag{6}$$

This method of deweighting the upper limb results in a variation in the applied force across the upper limb postures. Secondly, use of only three controllable forces on a system with 4 generalized coordinates results in underactuation—not all the effects of gravity can be completely compensated for.

Figure 11A:
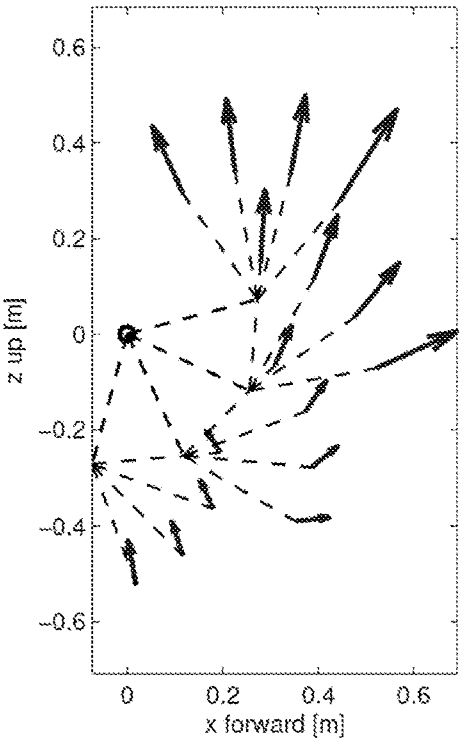
FIGS. 11A and 11B plot calculated force in a number of postures in the sagittal (vertical) plane, and in the transverse (horizontal) plane, respectively, of an upper limb.
Figure 11B:
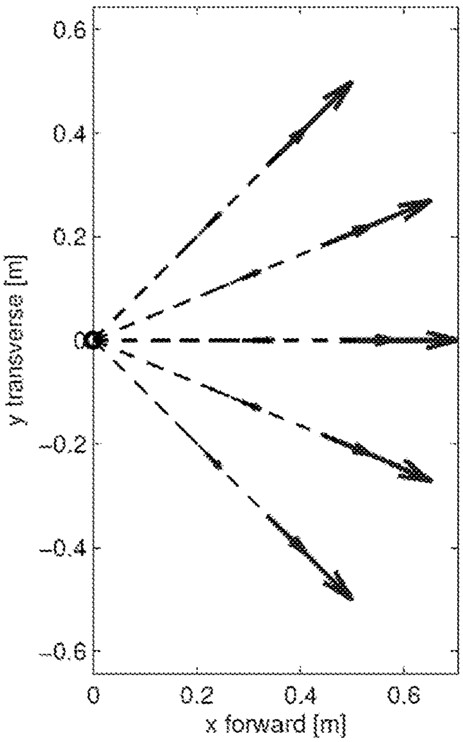

On the first point of variation across the workspace, it can be seen from Equ. (6) that the force is dependent on both the effect of gravity g(qh), as well as the Jacobian Jh(qh)—both of which are dependent on the posture of the subject qh. The effect of this is a variation in both the magnitude and direction of the required force across the workspace. A visualization of this can be seen in FIGS. 11A and 11B, which plot the calculated force in a number of postures in the sagittal (vertical) plane, and in the transverse (horizontal) plane. The force changes at each of these postures, with larger forces required with more elbow extension, and more shoulder elevation. However, it should be noted that the magnitude and direction does not change significantly with differences in the transverse plane, associated with the angle of elevation of the shoulder S.

Secondly, the system under consideration is underactuated: only force can be controlled, in three directions ($f_r \in \mathbb{R}^3$), but the upper limb is modelled having four joints ($q_h \in \mathbb{R}^4$). Thus, not all components of the gravity vector gh(qh) can be completely compensated for at all times.

The result of applying the present deweighting methodology to a manipulandum device controlling only the force—and not the moments—at the end-effector can be identified by projecting the effects of the driven force back into the human joint space (i.e. the generalized coordinates):

$$\tau_{uncomp}=J_h^T(q_h)f_r. \tag{7}$$

As a result, the component of the gravitational terms that are not compensated for by the deweighting algorithm can be expressed as:

$$\tau_{uncomp} = g(q_h) - J_h^T(q_h)f_r \tag{8}$$

$$= g(q_h) - J_h^T(q_h)J_h^{T\#}(q_h)g(q_h) \tag{9}$$

$$= (I_4 - J_h^T(q_h)J_h^{T\#}(q_h))g(q_h) \tag{10}$$

with $I_4$ being the 4×4 identity matrix.

Figure 12:
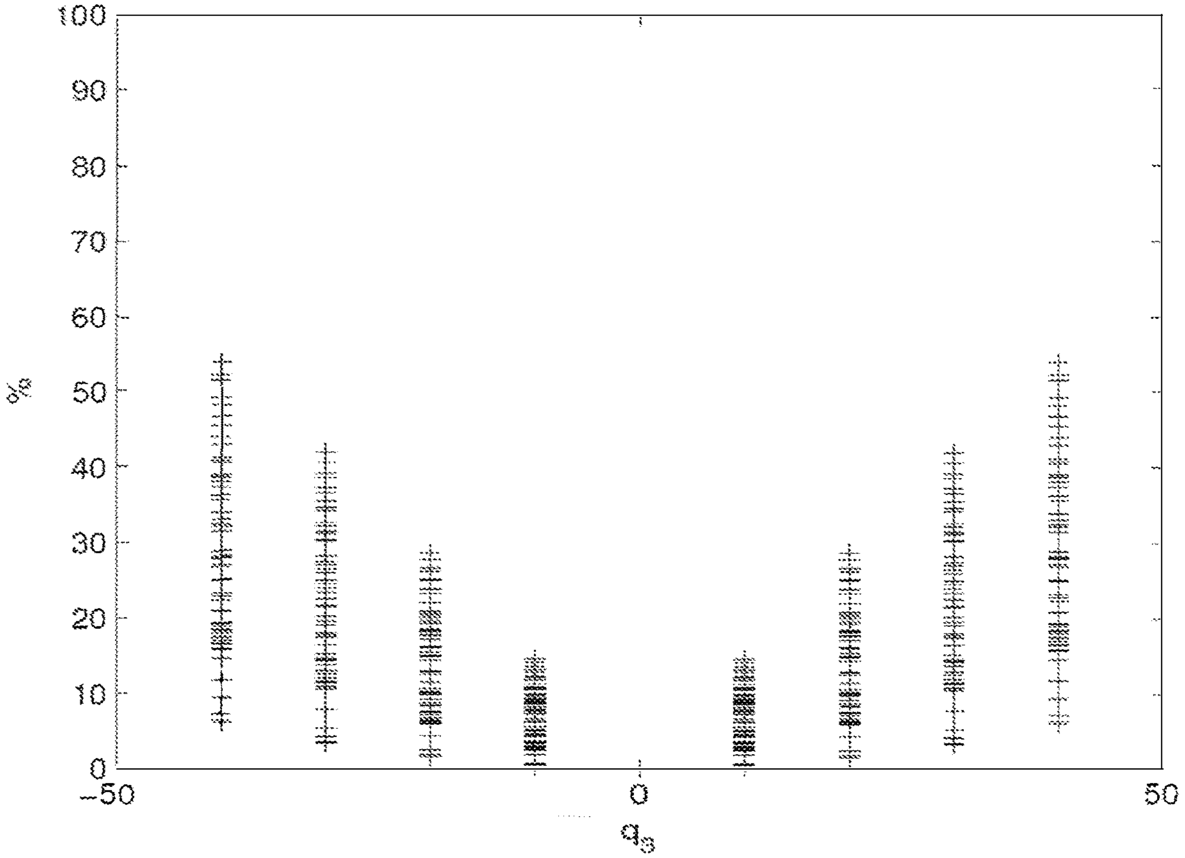
FIG. 12 shows the percentage of uncompensated torques against the internal/external rotation angle for different postures of the upper limb.

Numerical calculation of this expression demonstrates that, when no moment is applicable at the contact location, the deweighting torque at the elbow joint E is fully compensated for, but some components of the shoulder torques are left uncompensated. This can be seen in FIG. 12, which shows the percentage of uncompensated torques against the internal/external rotation angle for different postures of the upper limb (i.e. about $q_3$). It can be observed that these uncompensated torques are: (1) null (fully compensated for) when the internal/external rotation of the shoulder is at 0 degrees (i.e. elbow directly down) and (2) otherwise dependent on the full arm posture, including the elbow extension (i.e. cannot be expressed solely in the shoulder frame).

Uncompensated torques lie in the dynamic null-space of the arm, meaning that these are torque not responsible for any linear acceleration of the hand. It is to note that this null-space is different from the kinematic null-space of the arm which lies along the swivel angle axis (defined and used for human-exoskeleton interaction analysis in [30]) (discussed further below).

IV. Demonstration of Capability

An example of device 10 was used as an experimental platform for implementation of the deweighting controller. The experiment and experimental platform presented here provide a demonstration of the platform's and control strategy's capability.

A. Apparatus

Figure 13:
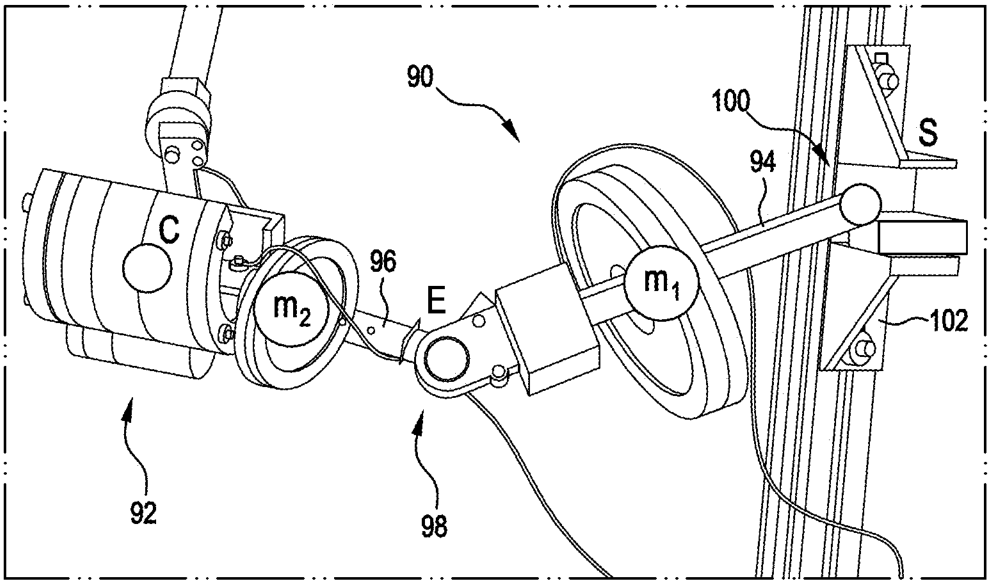
FIG. 13 is a view of a mechanical arm constructed according to the model of FIG. 10, according to an embodiment of the present invention.

A mechanical arm was constructed as per the model identified in FIG. 10, and is shown at 90 in FIG. 13 together with the end-effector 92 of the example of device 10 employed in these experiments. The mechanical arm 90 included two links 94, 96 connected to each other with a revolute joint 98; revolute joint 98 included a ball bearing and represented the elbow E. The proximal end 100 of arm 90 was connected to a fixed frame 102 with a spherical joint (in the form of, in this example, an Igus™ Spherical Bearing)—not shown—representing the shoulder S, and the distal end 104 was connected to end-effector 92 of device 10. Weights of $m_1$=1 kg and $m_2$=1 kg were secured respectively at the center of each link 94, 96.

Magnetic sensors (trakSTAR, Ascension Technologies) were used to measure the orientation of links 94, 96; the orientation was used to compute the posture of the mechanical arm $q_h$ in real time (at 30 Hz). These results were used in conjunction with an estimation of the model to calculate the required robotic force according to Equ. (6).

B. Procedure

This equipment was used to perform a validation experiment and demonstrate the feasibility of the deweighting control strategy in this application.

In this experiment, end-effector 92 was moved by device 10 to four different locations within the workspace in position control. These positions were limited by the range of motion of arm 90, but chosen such that they represented as wide a range as possible. Once each position was reached, the control was switched to the deweighting strategy. From this point, the response of the system was recorded.

C. Results

Figure 14:
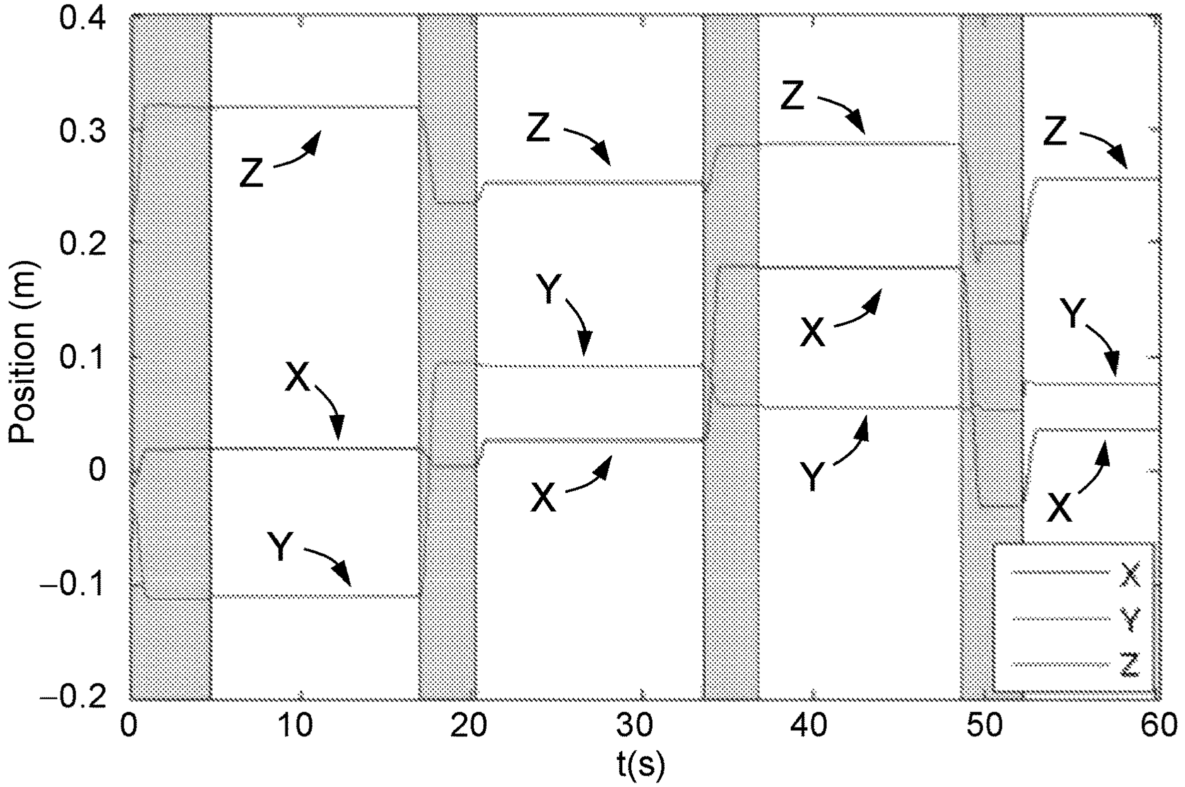
FIG. 14 displays the position of the end-effector of the electromechanical robotic manipulandum device of FIGS. 1A and 1B over time, i.e. the position of the contact point between device and the wrist.

FIG. 14 displays the position of end-effector 92 of device 10 over time, i.e. the position of the contact point between device 10 and the wrist point C of arm 90. As can be observed, the system is capable of stabilizing arm 90 at each posture that it was moved to. Drift can be observed in some postures when the system switches from position control to gravity compensation. This is not surprising given that the proposed strategy relies only on an open-loop control and that both the mechanical arm and robotic device are highly backdrivable. Drift thus can be explained by the difference between the model and the actual mechanical arm 90, and errors in posture measurements. Nevertheless, this drift is negligible, particularly with respect to a rehabilitation application, in which even a passive human arm is not backdrivable owing to muscles, ligaments and tendons at the joints.

Figure 15A:
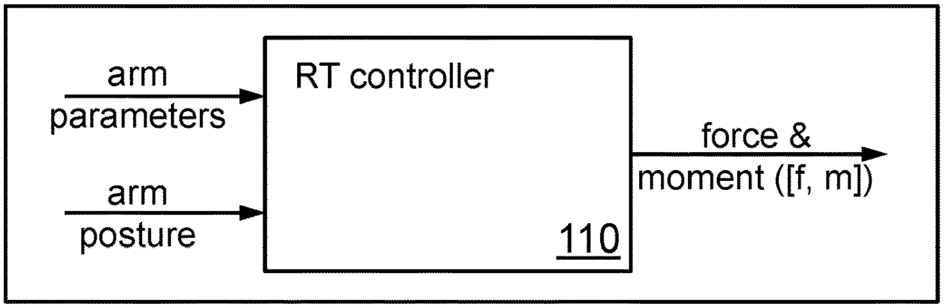
FIG. 15A is a schematic view of a controller for implementing a deweighting control strategy according to an embodiment of the present invention.

FIG. 15A is a schematic view of a controller 110 for implementing the deweighting control strategy of this aspect of the invention. Referring to FIG. 15A, controller 110 is in the form of a Real-Time controller that receives upper limb parameters that designate the dynamic characteristics of the upper limb including the mass, inertia and length of each segment, and upper limb posture parameters that define a representation of the upper limb in space. Controller 110 outputs force and moment parameters [f, m], which are forces and moments to be applied by device 10 (or other comparable robotic system) at the contact point to compensate for the weight of the upper limb—and thereby deweight the upper limb, according to Equ. (6).

Figure 15B:
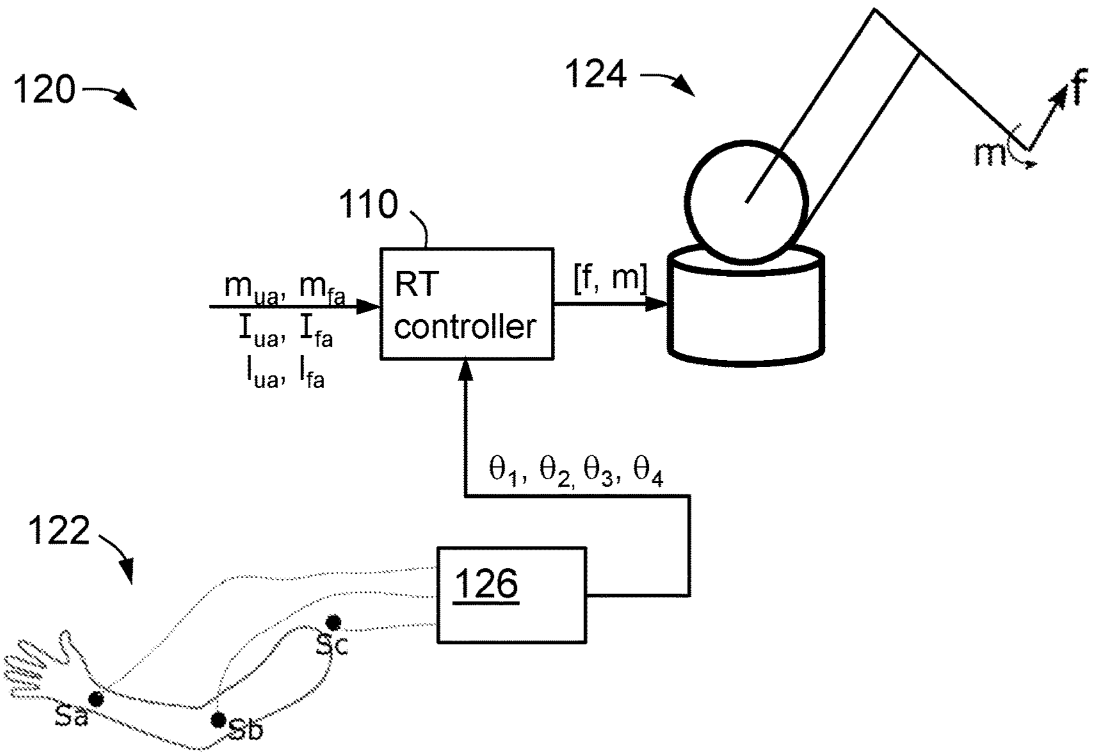
FIG. 15B is a schematic view of a deweighted robotic manipulandum device according to an embodiment of the present invention, shown with an upper limb and external sensors.

FIG. 15B is a schematic view of a deweighted robotic manipulandum device 120 according to this aspect of the present invention, shown with the upper limb 122 to be deweighted. Device 120, as employed in the aforementioned experiments, includes a controller 110 (cf. FIG. 15A), a manipulandum device 124 (cf. device 10), three 3 degree-of-freedom sensors Sa, Sb, Sc (for attachment to upper limb 122) that output their respective absolute orientations in space, and a processor 126 that receives the outputs of sensors Sa, Sb, Sc and outputs $\theta_1$, $\theta_2$, $\theta_3$, $\theta_4$ designating the joint angles of upper limb 112 to controller 110. $\theta_1$, $\theta_2$, $\theta_3$, $\theta_4$ are respectively the shoulder plane-of-elevation, the shoulder elevation, the shoulder internal/external rotation and the elbow flexion/extension.

Controller 110 is also provided with the mass of the forelimb (e.g. forearm) and the mass of the upper-limb (e.g. upper-arm) $M_{ua}$, $M_{fa}$, the inertia matrices of the forelimb and upper-limb $I_{ua}$, $I_{fa}$, and the lengths of the forelimb and upper-limb $l_{ua}$, $l_{fa}$. Controller 110 determines the forces and moments [f, m] to be applied by device 124 from these inputs according to Equ. (6).

Other Devices and Clinical Application

Deweighting is commonly performed for rehabilitation of neurologically impaired patients; in lieu of devices, therapists often perform this manually, and passive devices exist which are design to provide only deweighting support, such as the ArmeoSpring™ (Hocoma, Switzerland) and the SaeboMAS™ (Saebo, USA). Such devices can be mechanically tuned to provide different levels of supported, but cannot impart or implement other control strategies.

Certain existing active robotic devices also provide some deweighting functionality. Two-dimensional manipulanda provide deweighting by their planar design, but provide partial deweighting functionalities and in a limited workspace only. Exoskeletons offer most flexibility in deweighting and control strategy, but can be difficult to set up and use in a clinical setting. The present results demonstrate that appropriately-designed end-effector based devices can provide deweighting support equivalent to that provided by an exoskeleton. It is envisaged that an extension of these findings to other control strategies (such as those discussed in [21], [31]), which have predominantly been implemented in exoskeleton-based robotic devices, should allow more advanced and effective strategies to be developed on simpler platforms, accelerating their translation to clinical practice.

However, concerns remain regarding the support of the device in other dimensions; for example, the analysis presented here only addresses the joint torques required at each location, and no consideration is given to interaction forces (through the assumption that the shoulder and elbow joints are ideal spherical and revolute joints respectively). In reality, physiological joints are connected by ligaments and muscle, which do not always reflect the ideal representations, particularly with respect to stroke patients due to conditions such as subluxation. A further analysis may be constructed to estimate this.

Figure 16:
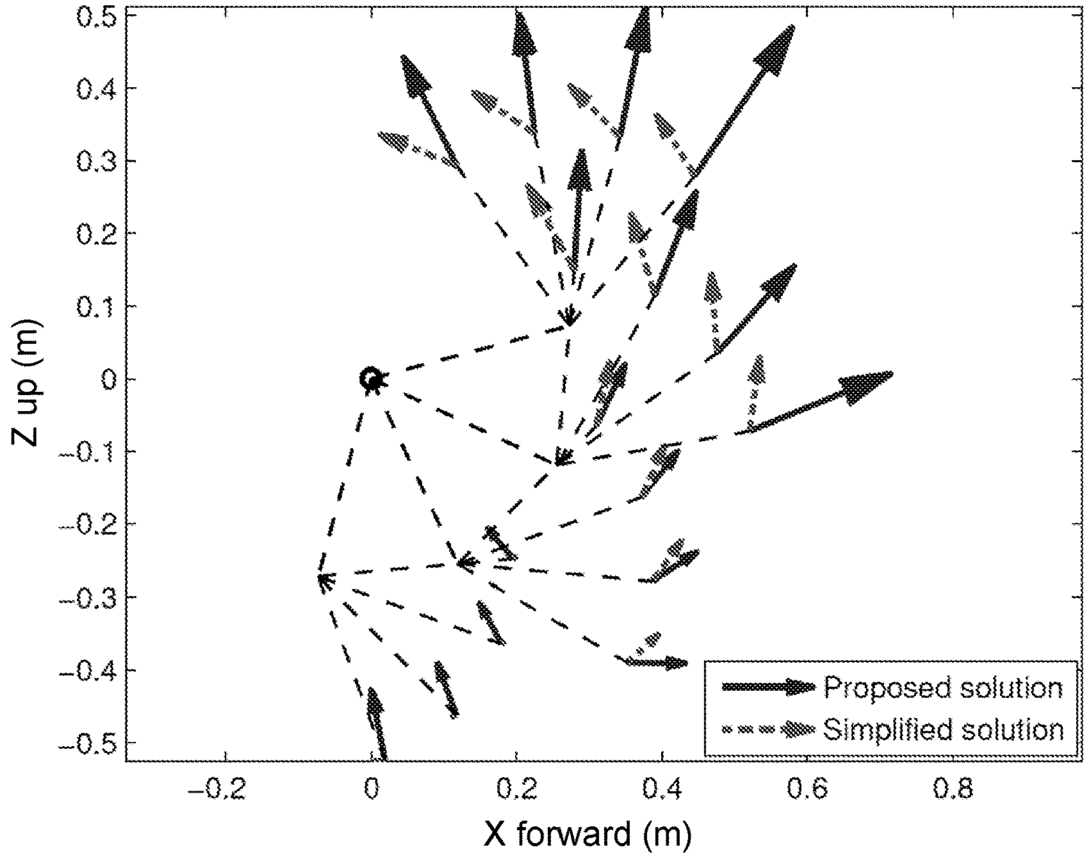
FIG. 16 shows a comparison of the deweighting control strategy according to an embodiment of the present invention and another deweighting control strategy considering an incomplete model of the human arm.

A deweighting control strategy was presented in [26]. In that work, the deweighting strategy implemented assumed a different model of the arm—that of a rigid elbow. As such, moments about the elbow were not compensated for. A comparison of the deweighting control strategy detailed in [26], and the one proposed herein is shown in FIG. 16, in dashed and solid arrows respectively. It can be seen that there is a significant difference between the two: the simplified solution (dashed arrows) proposes a force of smaller magnitude than that of the proposed solution (solid arrows); simplified solution has a force that is always orthogonal to the vector between the shoulder and the contact location. The proposed solution includes a component of force of the same magnitude and in the same direction as the simplified solution, but also includes a orthogonal component which addresses the fact that the elbow is now considered as a joint. This 'pulls' the elbow joint outwards, such that it does not bend owing to the effects of gravity. Although no hardware implementation was presented in the previous work [26], it is clear that such an implementation would not fully negate the effect of gravity around the elbow joint.

Limitations and Practical Considerations

Uncompensated Torques: As discussed above, the under-actuated nature of the system results in gravity torques that are not compensated for. Nevertheless, these torques being in the dynamic null-space of the arm are of minor importance as they do not contribute to any linear acceleration of the contact point and thus of the subject hand. Moreover, the totality of the elbow torques are compensated for, which seems appropriate for upper-limb rehabilitation application where patients often exhibit important limitations of elbow movement, often compensated by shoulder and trunk movements [32].

The use of force-controlled only devices cannot physically prevent patients from moving with this unnatural synergy. As a result, if the goal of the treatment is to discourage this synergy, alternate means of reducing this synergy is required, as the one proposed in [33]. It is noted that this is not necessarily a disadvantage: physically preventing a movement does not prevent the muscle activation patterns, but it suppresses its effects, which may be counter-productive to discouraging the activation patterns to start with.

Requirement for Measurement: A second limitation in the application of this work to practice is the requirement that Jacobian Jh(qh) and gravity vector g(qh) be known. This requires knowledge of the physical characteristics of the patient, and measurement of their posture in real time. However, it is noted that such knowledge is relatively robust to error and noise, due to the inherent physical damping provided by having the human in the loop. The measurement can be achieved through a variety of sensors—including sensors on the robotic device, the magnetic sensors used in this work, or inertial measurement unit (IMU) based sensors.

According to another aspect of the present invention, there is provided an end-effector in the form of a mechatronics handle to be used with a 3d end-effector based arm rehabilitation device, such as device 10 or device 120. The characteristics of this mechatronics handle are adapted for use as a component of such devices: when a human subject is strapped in a 3d manipulandum device, the hand is left free (and hence able to grasp) and can rotate in every direction, leaving the forearm orientation unconstrained. In a rehabilitation application, for example, it is desirable that the subject can perform the rehabilitation movements with the hand in a 'functional grasping posture' even if the subject is not able to actively control his/her hand prono-supination. This is especially important when exercises involve real world movements and can influence rehab outcomes. In addition, the subject should be provided with sufficient support of the whole arm. The mechatronics handle desirably inhibits rotation of the upper limb (e.g. arm) in a vertical plane when required.

Figure 17A:
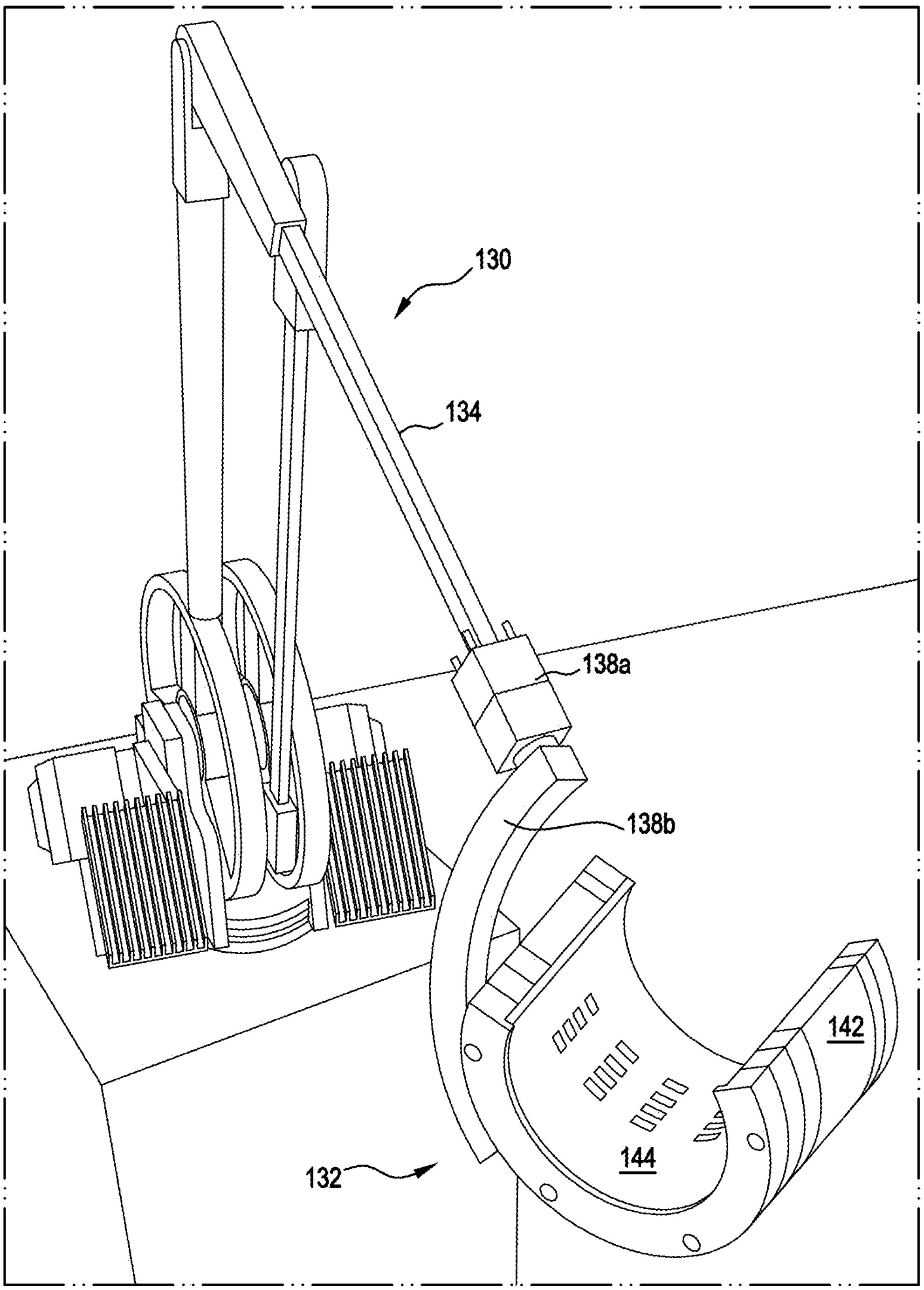
FIGS. 17A and 17B are views of an electromechanical robotic manipulandum device with a mechatronics handle according to an embodiment of the present invention.
Figure 17B:
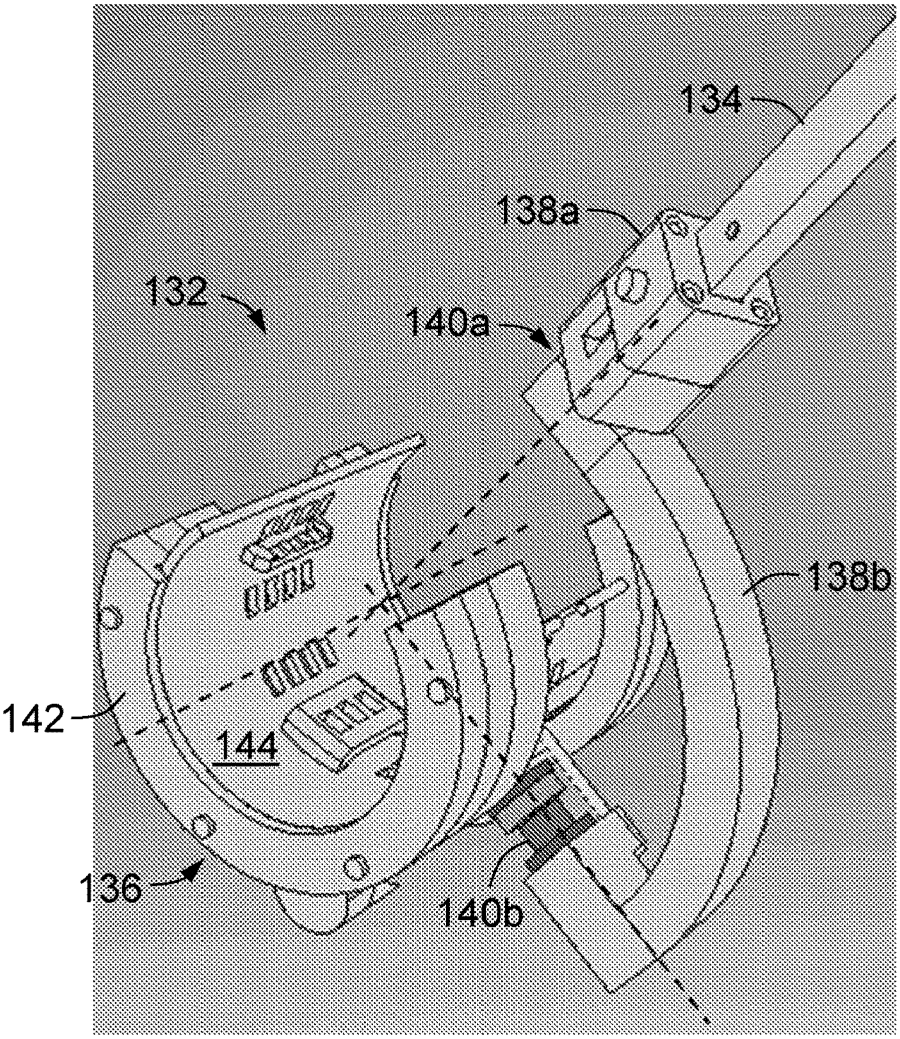
Figure 18A:
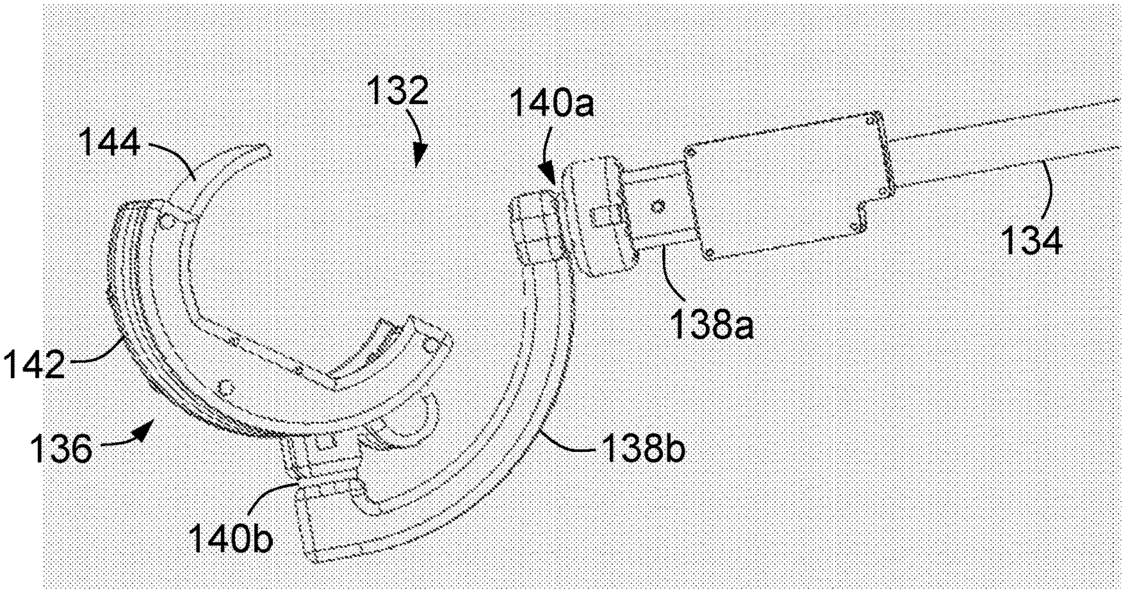
FIGS. 18A to 18E are schematic views of a mechatronics handle according to a variation of the embodiment of the device of FIGS. 17A and 17B.
Figure 18B:
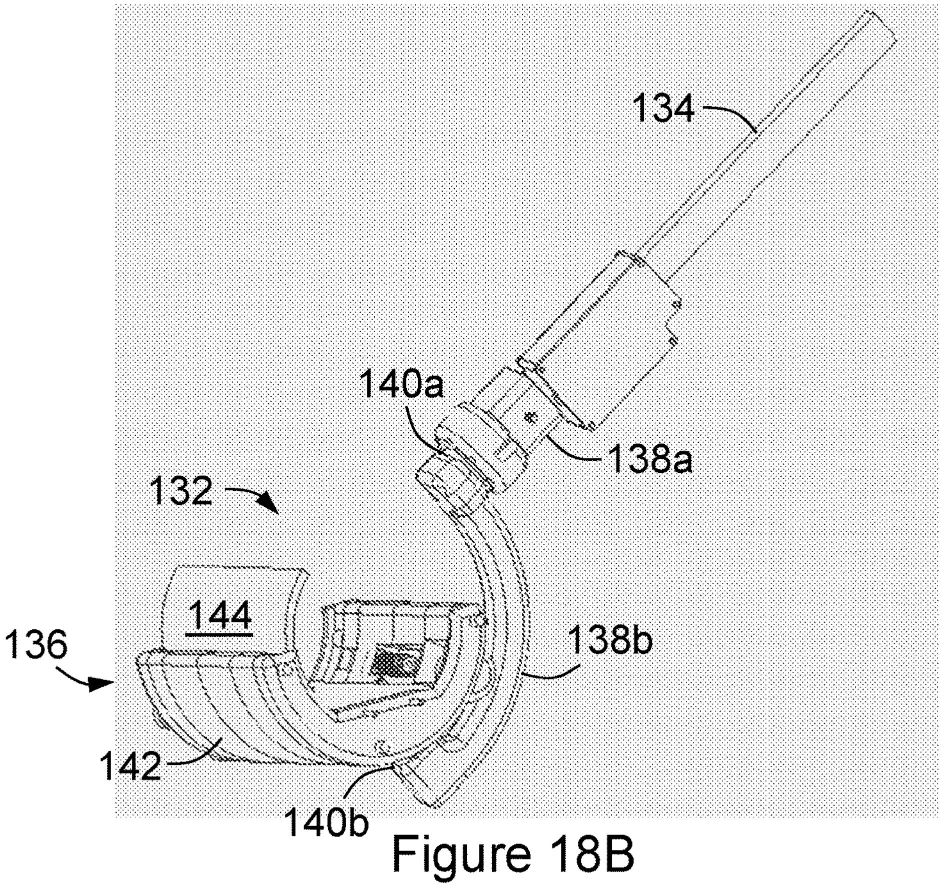
Figure 18C:
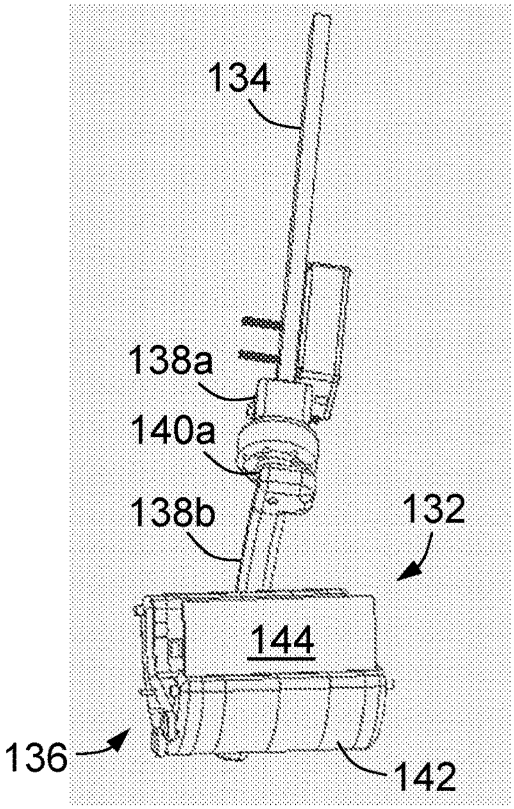
Figure 18D:
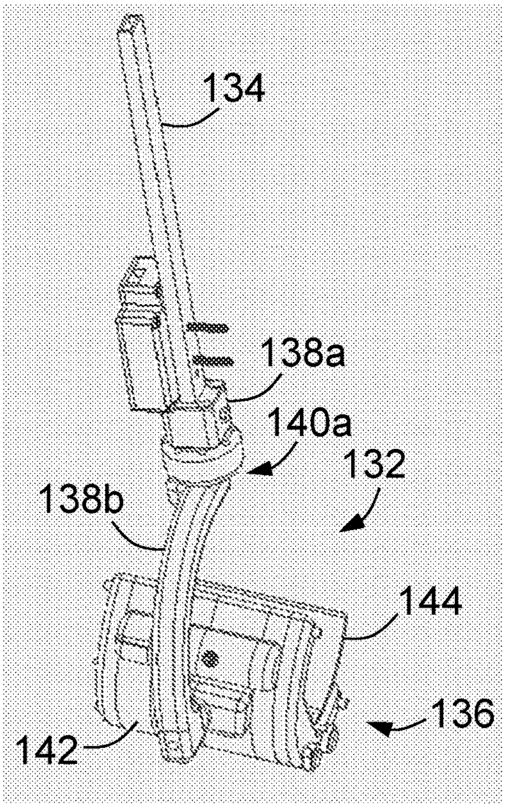
Figure 18E:
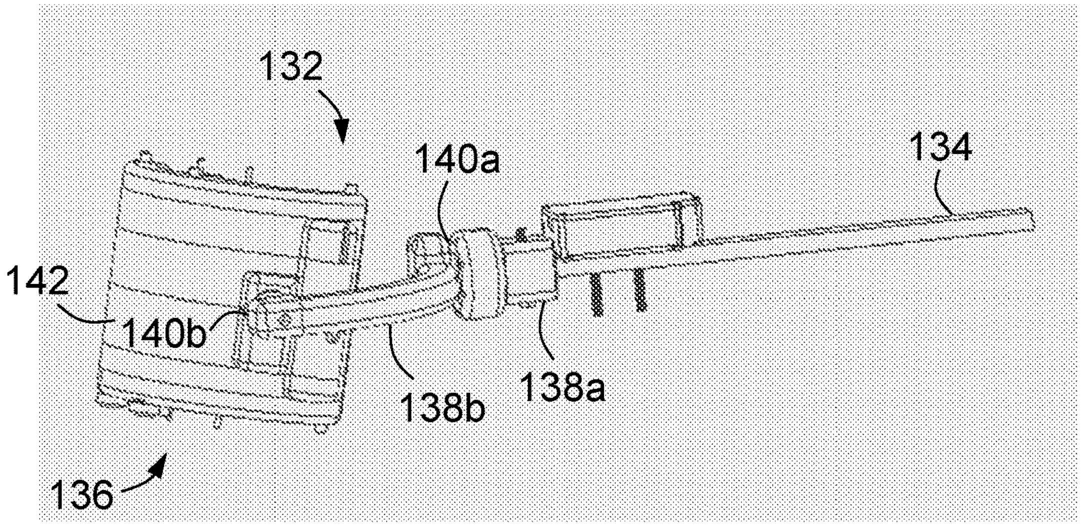

Thus, FIGS. 17A and 17B are views of an electromechanical robotic manipulandum device 130 according to an embodiment of the present invention, which is comparable to device 10 of FIGS. 1A and 1B, but which includes a mechatronics handle 132. Mechatronics handle 132 is coupled to the distal beam 134 of manipulandum device 130. Mechatronics handle 132 is, in effect, a wrist handle comparable in role to that of wrist unit 16 of device 10 of FIGS. 1A and 1B. Mechatronics handle 132 includes a wrist cuff 136 for engaging the subject's wrist. In use, the subject's forearm is fitted to a wrist splint (not shown), which is in turn attached to wrist cuff 136 with a suitable attachment, such as Velcro™ straps (not shown). Wrist cuff 136 and subject wrist splint leaves the subject's hand free to reach and grasp, but may optionally embrace the subject's thumb.

FIGS. 18A to 18E are schematic views of mechatronics handle 132, together with a portion of distal beam 134, according to a minor variant of the version shown in FIGS. 17A and 17B, so like reference numerals have been used to identify like features.

Mechatronics handle 132 of FIGS. 17A, 17B and 18A to 18E includes first and second links 138*a*, 138*b*. First link 138*a* is rigidly coupled to distal beam 134; second link 138*b* is rotationally coupled to first link 138*a* and to wrist cuff 136 with first and second rotational joints 140*a*, 140*b* using thrust bearings; their rotation is measured with potentiometers (not shown). First and second rotational joints 140*a*, 140*b* are located such that their axis are orthogonal one another; these two axes can be locked in place with locking mechanisms (not shown).

Wrist cuff 136 includes an outer shell 142, to which second rotational joint 140*b* is coupled, and an inner shell 144 rotatably mounted within outer shell 142 and to which the user splint is attached. Outer shell 142 contains a motor, a cable reduction system (bushing), a potentiometer and electronics (not shown). Inner shell 144 can rotate within outer shell 142 about an axis aligned with the subject's forearm (viz. prono-supination joint) and actuated with a cable (not shown) wound around the bushing on the motor axis (which is also orthogonal to the two first axes). The rotation of inner shell 144 is facilitated by a series of roller bearings (not shown) in inner shell 144 and/or supported by outer shell 142. In this example, the wrist splint is strapped to inner shell 144 with Velcro™ straps.

Figure 19A:
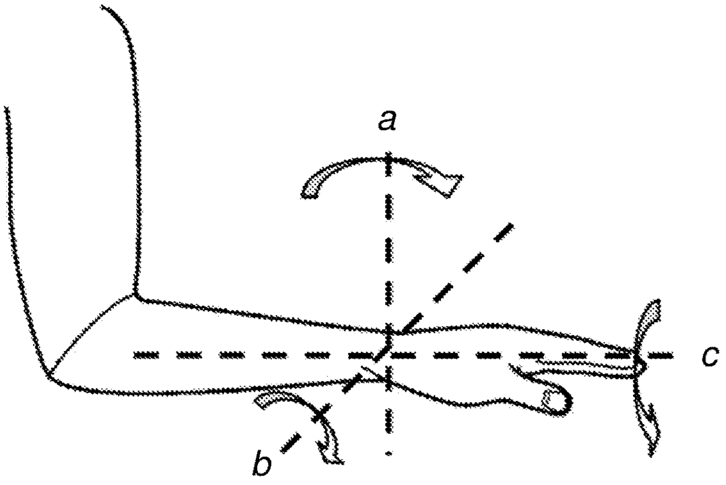
FIG. 19A depicts the three degrees of freedom of the wrist.

Mechatronics handle 132 has three degrees of freedom of rotation. As depicted schematically in FIG. 19A, these three degrees of freedom correspond to those of the wrist; the degrees of freedom of rotation a, b, c are centred at the approximate centre of the subject's wrist joint and allow the hand to rotate freely around that point. According to this embodiment, mechatronics handle 132 includes sensors (not shown) that measure all three rotations, outputting data that characterizes a full 3d orientation of the subject's forearm.

Figure 19B:
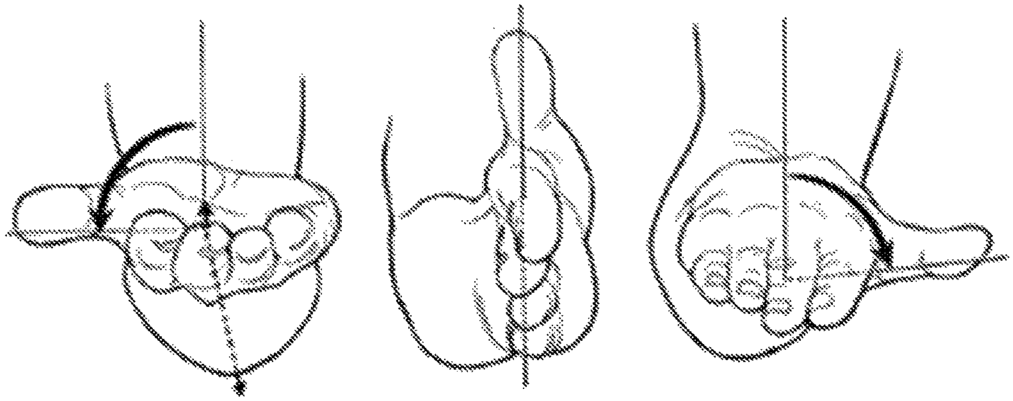
FIG. 19B depicts the prono-supination joint and its rotation from supination to neutral to pronation positions.

The last rotation c is about an axis in-line with the subject's forearm, providing the prono-supination rotation. The prono-supination joint and its rotation are explained schematically in FIG. 19B, in which are depicted—from left to right—supination, neutral and pronation positions. Rotation of wrist cuff 136 is motorized and can be controlled such that the palm of the subject is always in a functional posture, such that—for example—an axis directly out of the subject palm is always orthogonal to a vertical axis. The prono-supination joint may alternatively be left free to rotate, if desired, and hence its orientation controlled by the subject, as wrist cuff 136 is backdriveable.

The two other degrees of freedom (b and c) are not motorized and hence are free to rotate. However, these two degrees of freedom may be mechanically locked in a desired position in order to fully maintain the subject's forearm.

The electronics of mechatronics handle 132, which include a microcontroller, employ the orientations of distal beam 134 and of mechatronics handle 132 in order to generate control commands to control the angular position of the actuated prono-supination joint (i.e. the rotational position of inner shell 144 relative to outer shell 142) when desired. The electronics of mechatronics handle 132 report the forearm orientation, expressed in the reference frame of manipulandum device 130, back to the controller of manipulandum device via an I2C communication line.

Outer shell 142 is equipped with one or more controls (such as buttons) for controlling the behaviour of manipulandum device 130 (i.e. demonstrate movements, repeat, stop, etc.) and alert mechanisms (e.g. one or more LEDs and/or buzzers), to provide mechatronics handle 132 with a user interface, for use—for example—by a therapist.

Figure 20:
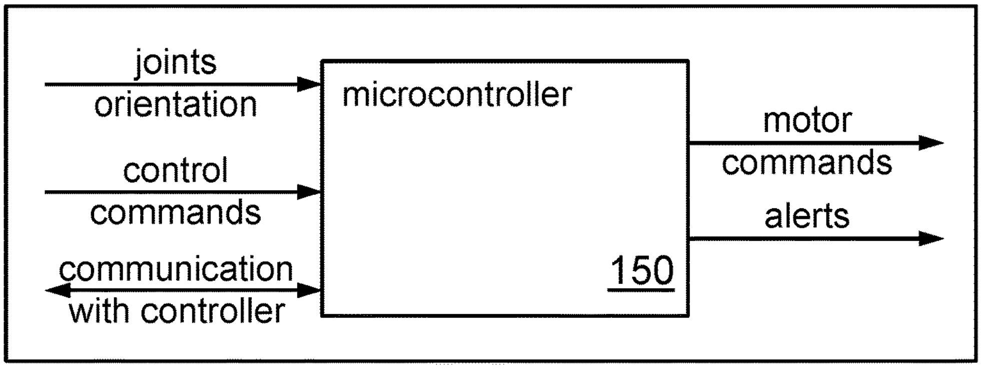
FIG. 20 is a schematic view of a microcontroller of a version of the mechatronics handle of the device of FIG. 17, according to an embodiment of the present invention.

Although all the processing required to control mechatronics handle 132 may be performed by the aforementioned controller of manipulandum device 130, mechatronics handle 132 may alternatively be provided with a microcontroller to perform this role. Thus, FIG. 20 is a schematic view of a microcontroller 150 of a version of mechatronics handle 132, which may be located—for example—within outer shell 142 or on distal beam 134. (Alternatively, microcontroller 150 may be regarded as depicting the same functionality but as implemented by the controller of manipulandum device 130.) Microcontroller 150 receives inputs (in the form of the joint orientations) and control commands (from the controls described above), and communicates with (i.e. to and from) the controller of manipulandum device 130. Microcontroller 150 outputs motor commands to the motor of outer shell 142 of mechatronics handle 132, and alerts (to, for example, the aforementioned LEDs and/or buzzers).

CONCLUSION

The dynamics of device 10 have a weak effect on the resulting movements made with the arm, and a large enough workspace to cover the active range of motion of healthy users. The ability of device 10 to provide a useful force over a large 3D workspace, while remaining transparent, demonstrates that device 10 can yield an appropriate balance between classes existing upper-limb rehabilitation systems—exoskeletons and planar manipulanda.

It is envisaged that other embodiments may include upper-limb rehabilitation specific control implementations. The motorized and dynamically transparent platform thus allows the practical realization of various repetitive exercise motions investigated in the robot assisted rehabilitation literature, such as reviewed in [21], and the realization of assistive strategies, such as [22] and [23], in a spatial workspace.

Furthermore, device 10 was been designed to allow free movement of the hand. Whilst the majority of robotic devices for rehabilitation utilize a virtual environment, studies indicate the importance of context in effective rehabilitation exercises [21]. The use of virtual environments is useful for motivation (the exercises can be 'gamified'), an additional mapping between the real and virtual worlds is required, thus questions remain regarding generalization of these exercises. Furthermore, traditional rehabilitation exercises are generally goal-orientated—for example, using a spoon to feed oneself. As a result, the ability to have a free hand to work with a physical object is an advantageous characteristic of device 10.

Furthermore, the disclosed control strategy for deweighting a patient's arm in three dimensional end-effector based devices can be used to minimize or negate the effects of gravity on the 4 degree of freedom arm model. Furthermore, the implementation of this strategy on device 10 is underactuated owing to its inability to provide moments at the end-effector. Such an arrangement can be used to minimize or negate the effects of gravity, except for moments about the axis connecting the shoulder and contact location point.

This work can be further developed to more completely address the effects of other configurations of underactuation (for example, a device capable of applying moments in certain directions only), and the capability of the device to apply other dynamic conditions to the patients. Application-based experimental work can be completed in the implementation of this control strategy with both healthy subjects and patients, to observe if and how these interaction forces change the behaviour of the subjects, and to measure how the muscle activity changes under this condition.

Modifications within the scope of the invention may be readily effected by those skilled in the art. It is to be understood, therefore, that this invention is not limited to the particular embodiments described by way of example hereinabove. For example, while the embodiments described in detail above relate to communication cables, it will be apparent that the invention may also be applied to other types of cable, including for electrical power transmission.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

REFERENCES

[1] P Maciejasz, J Eschweiler, K Gerlach-Hahn, A Jansen-Troy, and S Leonhardt. A survey on robotic devices for upper limb rehabilitation. *Journal of neuroengineering and rehabilitation,* 11(1):3, 2014.

[2] A Weightman, A C Alexoulis-Chrysovergis, and S Oltean. What should we consider when designing rehabilitation robots for the upper limb of the neurologically impaired? In *Procs Australasian Conf Robotics and Automation*, pp 1-10, 2014.

[3] N Hogan, H I Krebs, J Charnnarong, P Srikrishna, and A Sharon. MIT-MANUS: a workstation for manual therapy and training. In *Proceedings of the IEEE International Workshop on Robot and Human Communication*., pp 161-165, 1992.

[4] C G Burgar, P S Lum, P C Shor, and H F M Van der Loos. Development of robots for rehabilitation therapy: the Palo Alto VA/Stanford experience. *Journal of Rehabilitation Research and Development,* 37(6):663-674, 2000.

[5] T Nef, M Mihelj, and R Riener. Armin: a robot for patient-cooperative arm therapy. *Medical & biological engineering & computing,* 45(9):887-900, 2007.

[6] P Garrec, J P Friconneau, Y Measson, and Y Perrot. ABLE, an innovative transparent exoskeleton for the upper-limb. In *The IEEE/RSJ International Conference on Intelligent Robots and Systems*, pp 1483-1488, September 2008.

[7] M C Cirstea and Mindy F Levin. Compensatory strategies for reaching in stroke. *Brain,* 123(5):940-953, 2000.

[8] R Q Van der Linde, P Lammertse, E Frederiksen, and B Ruiter. The hapticmaster, a new high-performance haptic interface. In *Proc. Eurohaptics*, pp 1-5, 2002.

[9] M J Johnson, K J Wisneski, J Anderson, D Nathan, and R O Smith. Development of ADLER: the activities of daily living exercise robot. In *The First IEEE/RAS-EMBS International Conference on Biomedical Robotics and Biomechatronics,* 2006 (*BioRob* 2006), pages 881-886. IEEE, 2006.

[10] N Jarrassé and G Morel. Connecting a human limb to an exoskeleton. *IEEE Transactions on Robotics,* 28(3): 697-709, 2012.

[11] I J Hubbard, M W Parsons, C Neilson, and L M Carey. Task-specific training: evidence for and translation to clinical practice. *Occupational Therapy International,* 16(3-4):175-189, 2009.

[12] C C Gordon, T Churchill, C E Clauser, B Bradtmiller, J T McConville, I Tebbetts, and R A Walker. Anthropometric survey of us army personnel: Summary statistics, interim report for 1988. Technical report, DTIC Document, 1989.

[13] E Dombre and W Khalil. *Robot manipulators: modeling, performance analysis and control*. John Wiley & Sons, 2013.

[14] N Hogan. Impedance control: An approach to manipulation. In *Procs. American Control Conference*, pp 304-313, 1984.

[15] N Jarrasse, M Tagliabue, J Robertson, A Maiza, V Crocher, A Roby-Brami, and G Morel. A methodology to quantify alterations in human upper limb movement during co-manipulation with an exoskeleton. 18(4):389-397, 2010.

[16] J Fong, V Crocher, D Oetomo, and Y Tan. An investigation into the reliability of upper-limb robotic exoskeleton measurements for clinical evaluation in neurorehabilitation. In *Procs 7th Intl IEEE EMBS Neural Engineering Conference*, April 2015.

[17] J Fong, V Crocher, D Oetomo, Y Tan, and I Mareels. Effects of robotic exoskeleton dynamics on joint recruitment in a neurorehabilitation context. In 2015 *IEEE Intl Conf Rehabilitation Robotics* (*ICORR*), pp 834-839. IEEE, 2015.

[18] S Balasubramanian, A Melendez-Calderon, and E Burdet. A robust and sensitive metric for quantifying movement smoothness. *IEEE Transactions on Biomedical Engineering,* 59(8):2126-2136, 2012.

[19] N Nordin, S Xie, and B Wünsche. Assessment of movement quality in robot-assisted upper limb rehabilitation after stroke: a review. *Journal of Neuro-engineering and Rehabilitation,* 11(1):137, 2014.

[20] L Marchal-Crespo and D J Reinkensmeyer. Review of control strategies for robotic movement training after neurologic injury. *Journal of Neuroengineering and Rehabilitation,* 6(1):20, 2009.

[21] S-H Zhou, J Fong, V Crocher, Y Tan, D Oetomo, and I Mareels. Learning control in robot-assisted rehabilitation of motor skills—a review. *Journal of Control and Decision,* 3(1):19-43, 2016.

[22] A U Pehlivan, D P Losey, and M K O'Malley. Minimal assist-as-needed controller for upper limb robotic rehabilitation. *IEEE Transactions on Robotics,* 32(1):113-124, 2016.

[23] N Shirzad and H F M Van der Loos. Evaluating the user experience of exercising reaching motions with a robot that predicts desired movement difficulty. *Journal of Motor Behavior*, pp 31-46, 2015.

[24] V S Huang and J W Krakauer. Robotic neurorehabilitation: a computational motor learning perspective. *Journal of Neuroengineering and Rehabilitation,* 6(1):5, 2009.

[25] T Nef, M Mihelj, G Colombo, and R Riener. ARMin-robot for rehabilitation of the upper extremities. In *Proceedings* 2006 *IEEE International Conference on Robotics and Automation* (*ICRA* 2006), pages 3152-3157. IEEE, 2006.

[26] J Fong, V Crocher, Y Tan, D Oetomo, and I Mareels. EMU: a transparent 3d robotic manipulandum for upper-limb rehabilitation. In 2017 *International Conference on Rehabilitation Robotics* (*ICORR*), pages 771-776. IEEE, 2017.

[27] S P Anderson and J Oakman. Allied health professionals and work-related musculoskeletal disorders: A systematic review. *Safety and Health at Work,* 7(4):259-267, 2016.

[28] G Wu, F C T Van der Helm, H E J D J Veeger, M Makhsous, P Van Roy, C Anglin, J Nagels, A R Karduna, K McQuade, X Wang, et al. ISB recommendation on definitions of joint coordinate systems of various joints for the reporting of human joint motionpart ii: Shoulder, elbow, wrist and hand. *Journal of Biomechanics,* 38(5): 981-992, 2005.

[29] Oussama Khatib. A unified approach for motion and force control of robot manipulators: The operational space formulation. *IEEE Journal on Robotics and Automation,* 3(1):43-53, 1987.

[30] H Kim, L M Miller, A Al-Refai, M Brand, and J Rosen. Redundancy resolution of a human arm for controlling a seven dof wearable robotic system. In 2011 *Annual International Conference of the IEEE Engineering in Medicine and Biology Society, EMBC*, pages 3471-3474. IEEE, 2011.

[31] A Basteris, S M Nijenhuis, A H A Stienen, J H Buurke, G B Prange, and F Amirabdollahian. Training modalities in robot-mediated upper limb rehabilitation in stroke: a framework for classification based on a systematic review. *Journal of Neuroengineering and Rehabilitation,* 11(1):111, 2014.

[32] M F Levin. Interjoint coordination during pointing movements is disrupted in spastic hemiparesis. *Brain,* 119(1):281-293, 1996.

[33] E B. Brokaw, P S. Lum, R A. Cooper, and Bambi R. Brewer. Using the kinect to limit abnormal kinematics and compensation strategies during therapy with end effector robots. In 2013 *IEEE International Conference on Rehabilitation Robotics* (*ICORR*), pages 1-6. IEEE, June 2013.

The invention claimed is:

1. An electromechanical manipulandum device, comprising:

a backdrivable drive system comprising a plurality of electrical motors;

an arm driveable by the drive system and having three degrees-of-freedom of motion;

a capstan transmission for transmitting actuating force from the drive system to the arm;

an end-effector coupled only to the arm at a single point, the end-effector configured to engage a user and having at least three degrees-of-freedom of rotational motion; and a control system configured to control the drive system to provide a calculated force to the end-effector in a selected direction and to enable backdrivability of the plurality of electrical motors, the calculated force being calculated based on parameters and posture of a limb of the user, wherein the device is controllable by the control system to compensate for a portion of a weight of the limb of the user, and wherein applying the calculated force at the single point compensates for the portion of the weight of an upper limb, wherein the parameter and posture of the limb of the user comprise masses of a forelimb and an upper-limb of the limb, inertia of the forelimb and upper-limb, and lengthy of the forelimb and upper-limb.

2. A device as claimed in claim 1, wherein the capstan transmission comprises at least one bushing rotatably drivable by an electrical motor and a corresponding capstan wheel, wherein the at least one bushing is configured to cause rotation of its corresponding capstan wheel via an associated transmission wire.

3. A device as claimed in claim 2, wherein the, or each, transmission wire is secured via threading of the transmission wire through a hole of the at least one bushing.

4. A device as claimed in claim 2, comprising a bushing for each degree of freedom of the arm.

5. A device as claimed in claim 1, wherein the arm is a semi-parallel arm.

6. A device as claimed in claim 1, wherein each degree-of-freedom of the end-effector is unactuated.

7. A device as claimed in claim 1, wherein at least one degree-of-freedom of the end-effector is actuated.

8. A device as claimed in claim 1, wherein the device is controllable by the control system to apply force to the user to assist movement by the user or wherein the device is controllable by the control system to compensate for a portion of a weight of the device to which the user would otherwise be subjected, and/or for friction within the device.

9. A device as claimed in claim 1, wherein the device is configured to track a position and/or orientation of the end-effector and to output one or more signals indicative thereof.

10. A device as claimed in claim 1, wherein the device is configured to engage a limb of the user, and the device further comprises a feedback generator for providing feedback indicative of a position and/or a posture of the limb.

11. A method of rehabilitating, training or assisting a user, the method comprising:

controlling a device as claimed in claim 1 and coupled to the user, with the control system, to resist inappropriate or less desirable physical movement by the user, to encourage more appropriate or desirable physical movement by the user, or to assist the movement of the user toward a goal of a physical movement of the user.

12. A method as claimed in claim 11, further comprising coupling a portion of an upper limb of the user to the end-effector.

13. An exercise method, the method comprising:

controlling a device as claimed in claim 1 and coupled to the user, with the control system, to resist less desired physical movement by the user, encourage more desired physical movement by the user, or to assist the movement of the user toward a goal of a physical movement of the user.

14. A method as claimed in claim 13, further comprising coupling a portion of an upper limb of the user to the end-effector.

15. An electromechanical manipulandum device, comprising:

a backdrivable drive system comprising a plurality of electrical motors;

an arm driveable by the drive system and having three degrees-of-freedom of motion;

a capstan transmission for transmitting actuating force from the drive system to the arm;

an end-effector coupled only to the arm at a single point, the end-effector configured to engage a user and having at least three degrees-of-freedom of motion and an ability to control the user's prono-supination motion; and a control system configured to control the drive system to provide a calculated force to the end-effector in a selected direction and to enable backdrivability of the plurality of electrical motors, the calculated force being calculated based on parameters and posture of a limb of the user, wherein the device is controllable by the control system to compensate for a portion of a weight of the limb of the user, and wherein applying the calculated force at the single point compensates for the portion of the weight of an upper limb, wherein the parameters and posture of the limb of the user comprise masses of a forelimb and an upper-limb of the limb, inertia of the forelimb and upper-limb, and lengths of the forelimb and upper-limb.

16. A device as claimed in claim 15, wherein the end-effector comprises a wrist cuff configured to engage a user, the wrist cuff being rotatable about an axis in-line with a subject's forelimb corresponding to prono-supination rotation and corresponding to one of the degrees-of-freedom of motion.

17. A device as claimed in claim 16, wherein the wrist cuff comprises an outer shell and an inner shell rotatable within the outer shell.

18. A device as claimed in claim 16, further comprising a motor for controlling an angular orientation of the wrist cuff.

19. A device as claimed in claim 15, further comprising a deweighting apparatus comprising:

a controller configured to receive inputs indicative of joint angles of the limb $q_h$, where $M_h(q_h)$ is a limb inertia matrix based on the masses of a forelimb and an upper-limb of the limb, inertia matrices of the forelimb and upper-limb, and the lengths of the forelimb and upper-limb;

wherein the controller is configured to determine calculated force $f_r$ and moments $m_r$ at the single point to be applied by the electromechanical manipulandum device to the limb from the inputs according to:

$$\begin{bmatrix} f_r \\ m_r \end{bmatrix} = J_h^{T\#}(q_h)g_h(q_h),$$

where $g_h(q_h)$ is a vector corresponding to torques of limb joints due to gravity, and $J^{T\#}{}_h(q_h)$ is a generalized inverse transpose of a limb Jacobian matrix, $J_h(q_h)$, given by:

$$J_H{}^{T\#}(q_h)=(J_h(q_h)M_h{}^{-1}(q_h)J_h{}^{-1}(q_h))^{-1}J_h(q_h)M_h{}^{-1}(q_h),$$

where $J_h(q_h)^T$ is the transpose of the limb Jacobian matrix, and T represents a transpose of the matrix.

* * * * *